United States Patent
Stone et al.

(10) Patent No.: US 10,638,411 B2
(45) Date of Patent: Apr. 28, 2020

(54) ROGUE BASE STATION ROUTER DETECTION WITH MACHINE LEARNING ALGORITHMS

(71) Applicant: LGS Innovations LLC, Herndon, VA (US)

(72) Inventors: Kerri Ann Stone, Lafayette, CO (US); Ronald Lance Justin, Denver, CO (US); Jennifer Lynn Ryan, Golden, CO (US)

(*) Notice: Subject to any disclaimer, the term of this patent is extended or adjusted under 35 U.S.C. 154(b) by 0 days.

(21) Appl. No.: 16/029,037

(22) Filed: Jul. 6, 2018

(65) Prior Publication Data

US 2019/0132741 A1 May 2, 2019

Related U.S. Application Data

(60) Provisional application No. 62/578,010, filed on Oct. 27, 2017, provisional application No. 62/578,016, (Continued)

(51) Int. Cl.
*H04W 48/00* (2009.01)
*H04W 48/16* (2009.01)
(Continued)

(52) U.S. Cl.
CPC .............. *H04W 48/16* (2013.01); *G06F 3/02* (2013.01); *G06K 9/6219* (2013.01); *G06K 9/6223* (2013.01); *G06N 20/00* (2019.01); *H04L 43/045* (2013.01); *H04L 63/1425* (2013.01); *H04L 63/1483* (2013.01); *H04W 12/12* (2013.01); *H04W 24/08* (2013.01); *H04W 68/005* (2013.01); *H04L 41/22* (2013.01);
(Continued)

(58) Field of Classification Search
CPC ..... H04W 48/16; H04W 12/12; H04W 24/08; H04W 68/005; H04W 84/042; H04W 88/08; G06N 20/00; G06F 3/02; G06K 9/6219; G06K 9/6223; H04L 43/045; H04L 43/13; H04L 63/1425; H04L 63/1483; H04L 41/22
See application file for complete search history.

(56) References Cited

U.S. PATENT DOCUMENTS

2016/0286410 A1* 9/2016 O'Malley .............. G06Q 30/06
2018/0070228 A1* 3/2018 Goldfarb ............. H04L 63/1408
2018/0351975 A1* 12/2018 Briggs ................ H04L 63/1425

* cited by examiner

*Primary Examiner* — Khai M Nguyen
(74) *Attorney, Agent, or Firm* — Baker & Hostetler LLP

(57) ABSTRACT

This application is directed to a method for detecting a rogue device in a network. The method includes a step of surveying the network. The method also includes a step of collecting broadcast data from cellular towers in the network based on the survey. The method also includes a step of distilling the collected broadcast data into abstract syntax notation one (ASN.1)-encoded system information blocks (SIBs) associated with plural devices. The method further includes a step of featurizing the ASN.1-encoded SIBs. The method even further includes a step of running the featurized, ASN.1-encoded SIBs through an unsupervised machine learning algorithm. The algorithm is executed by a processor to analyze all cells in the survey for the rogue device. Yet even further, the method includes a step of determining, based on the run, anomalous cells exhibiting characteristics of the rogue device from all cells in the survey.

14 Claims, 16 Drawing Sheets

Related U.S. Application Data filed on Oct. 27, 2017, provisional application No. 62/578,021, filed on Oct. 27, 2017.

(51) Int. Cl.
    *H04L 12/26*     (2006.01)
    *H04W 12/12*     (2009.01)
    *H04W 68/00*     (2009.01)
    *H04W 24/08*     (2009.01)
    *G06N 20/00*     (2019.01)
    *G06F 3/02*     (2006.01)
    *G06K 9/62*     (2006.01)
    *H04L 29/06*     (2006.01)
    *H04L 12/24*     (2006.01)
    *H04W 84/04*     (2009.01)
    *H04W 88/08*     (2009.01)

(52) U.S. Cl.
    CPC .......... *H04L 43/16* (2013.01); *H04W 84/042* (2013.01); *H04W 88/08* (2013.01)

| ≡ BITS | | | | | | |
|---|---|---|---|---|---|---|
| ⁂ ROGUE BSR | DETECTION LOGS | | | | | NOTIFICATIONS |
| ≡ ANOMALOUS CELLS | CONFIDENCE | GCI | RAT | TRIGGERS | CHANNEL/CODE | SIGNAL STRENGTH (dBm) |
| ⟷ SETTINGS | ☐ 30% | 31041103813412 | LTE | MACHINE LEARNING | 2425 / 264 | -49 | ⊙ DETECTION_DEVICE_0 DETECTED-LTE ROGUE BSR — 2 HOURS |
| ⊙ DEVELOPER SETTING | ☐ 30% | 31026011102839361 | UMTS | MACHINE LEARNING | 613 / 18 | -86 | 12 MINUTES |
| | ☐ 100% | 31026011102820163 | UMTS | MACHINE LEARNING | 612 / 62 | -93 | 20 MINUTES |
| | ☐ 30% | 31026011102835122 | UMTS | PROCEDURAL | 614 / 43 | -90 | 12 MINUTES |
| | ☐ 30% | 31026011102839362 | UMTS | PROCEDURAL | 685 / 52 | -85 | 12 MINUTES |
| | ☐ 65% | 31041103899513418 | UMTS | PROCEDURAL | 637 / 455 | -103 | 18 MINUTES |
| | ☐ 65% | 31041103899513419 | UMTS | PROCEDURAL | 637 / 224 | -100 | 12 MINUTES |
| | ☐ 65% | 31041103899513411 | UMTS | PROCEDURAL | 4384 / 448 | -83 | 12 MINUTES |
| | ☐ 65% | 31041103899513417 | UMTS | PROCEDURAL | 637 / 448 | -89 | 12 MINUTES |
| | ☐ 65% | 31026011084439362 | UMTS | PROCEDURAL | 2087 / 49 | -86 | 12 MINUTES |
| | ☐ 65% | 31026011084439361 | UMTS | PROCEDURAL | 2087 / 322 | -90 | 12 MINUTES |
| | ☐ 40% | 31026224012 | LTE | MACHINE LEARNING | 875 / 414 | -60 | 12 MINUTES |
| | ☐ 40% | 31026224202 | LTE | MACHINE LEARNING | 2001 / 268 | -48 | AN HOUR |
| | ☐ 65% | 31041103899513199 | UMTS | PROCEDURAL | 637 / 270 | -105 | 2 HOURS |
| | ☐ 65% | 31041103899513197 | UMTS | PROCEDURAL | 637 / 299 | -104 | AN HOUR |
| | ☐ 100% | 31026041335399632 | UMTS | PROCEDURAL | 684 / 63 | -50 | 12 MINUTES |
| | ☐ 65% | 31041103899513413 | UMTS | PROCEDURAL | 4384 / 224 | -89 | 12 MINUTES |
| | ☐ 30% | 31026011102836921 | UMTS | PROCEDURAL | 612 / 30 | -97 | 13 MINUTES |
| | ☐ 65% | 31026011084435121 | UMTS | PROCEDURAL | 2087 / 339 | -101 | AN HOUR |
| | ☐ 100% | 31026011102820161 | UMTS | MACHINE LEARNING | 683 / 48 | -99 | 31 MINUTES |

FIG. 5

| CONFIDENCE | GCI | RAT | TRIGGERS | CHANNEL/CODE | BITS ID | LAST SEEN | FIRST SEEN |
|---|---|---|---|---|---|---|---|
| 100% | 0010213666 | LTE | MASTER, PROCEDURAL | 650 / 14 | 001 | MON AUG 28 2017 13:27:... | THU AUG 24 2017 16:06:4 |
| 100% | 310260566 | UMTS | MACHINE LEARNING | 128 / 0 | 001 | FRI AUG 25 2017 16:51:45... | FRI AUG 25 2017 13:56:35 |
| 100% | 00105100010 | UMTS | MASTER, PROCEDURAL | 9 / 2 | 001 | MON AUG 28 2017 15:38:... | FRI AUG 25 2017 14:00:23 |
| 100% | 0010220001696 | LTE | MASTER, PROCEDURAL | 987 / 39 | 001 | FRI AUG 25 2017 16:51:45... | FRI AUG 25 2017 14:11:13 |
| 85% | 3102601102820161 | UMTS | MACHINE LEARNING | 683 / 48 | 001 | TUE OCT 10 2017 09:09:4... | TUE AUG 29 2017 11:55:5 |
| 100% | 310260130 | LTE | MACHINE LEARNING | 512 / 0 | 001 | THU SEP 14 2017 16:58:3... | THU SEP 14 2017 16:34:4 |

*FIG. 6*

| CELL INFORMATION | |
|---|---|
| RAT | UMTS |
| BAND | BAND 2 – 1900 – PCS A-F |
| NETWORK | AT&T; WIRELESS INC. (UNITED STATES) |
| PLMN | 310410 |
| LAC | 38996 |
| CELL ID | 13487 |
| CGI | 3104103899613487 |
| UARFCN | 412 |
| PSC | 508 |
| EC/NO | -17 |
| RSCP | -108 |
| FREQ. MHz | 1932.50 |
| FULL DECODE | YES |
| NEIGHBORS COMPLETE | YES |

BA-LIST (0)

INTRA FREQUENCY CELLS (1)

INTER RAT CELLS (0)

SIBs (7)
EXPAND ALL   COLLAPSE ALL

| SIB 1 | C641F508500B101017FF1FFA4D6272E21F441CAA20 |
|---|---|
| SIB 2 | 00A8F0 |
| SIB 3 | 881DE80044FC62D0506A0000214AFFFFFB8D8000 |
| SIB 5 | 73403EFFFF43FFFD3210F0290C0A8018000C8BF5B15EAF0FF85D81400... |
| SIB 7 | 43C080 |
| SIB 11 | 99400FF93E0AF70231C0A3D0256C0B5B0A44C04004CA8133E150C8080... |
| MIB | 20C42820606AC0443C083315019128D165F143811A0235A0428 |

FIG. 8

ROGUE BASE STATION ROUTER DETECTION WITH MACHINE LEARNING ALGORITHMS

CROSS-REFERENCE TO RELATED APPLICATIONS

This application claims the benefit of priority of U.S. Provisional Application No. 62/578,010 filed Oct. 27, 2017, entitled "Rogue Base Station Router Detection and Identification with Machine Learning Algorithms," U.S. Provisional Application No. 62/578,016 filed Oct. 27, 2017, entitled "Rogue Base Station Router Detection and Identification with Statistical Algorithms," and U.S. Provisional Application No. 62/578,021 filed Oct. 27, 2017, entitled "Rogue Base Station Router Detection and Identification with Procedural Algorithms," the contents of which are incorporated by reference in their entirety herein.

FIELD

This application is generally related to methods and architectures for detecting and identifying a cellular rogue base station router (RBSR) with machine learning algorithms.

BACKGROUND

By 2020, tens of billions of connected Internet of Things (IoT) devices with wireless interfaces will be in the marketplace and connect the modern world. Almost half of those IoT devices will have cellular radios. As a result, the likelihood of experiencing a cyber-attack by an RBSR continues to increase. Generally, RBSRs are classified as cellular routers that transmit outside the authority of the governing regulatory agency.

At a rudimentary level, low-cost commercial hardware and open source software can be employed by third parties to inflict significant attacks on enterprise Wi-Fi and cellular networks. Indeed, with a low-cost commercial off-the-shelf (COTS) software-defined radio (SDR) kit and open source cellular base station software, a malicious actor can deny cellular service to smart devices and machine-to-machine (M2M) networks. Further, a malicious actor can remotely track persons via their phones, snoop on communications, and inject malicious software into devices. The consequences can range from unfavorable user experiences and social disturbances to more significant concerns including financial loss and negative media exposure.

There is a need in the art for techniques and architectures for detecting an RBSR, such as an illegal/rogue commercial cellular tower in a network, over multiple cellular protocols.

There is also a need in the art for techniques and architectures for identifying the technologies in use (e.g., Open BTS, OpenAirInterfaceLTE, etc.) by a detected RBSR.

There is also a need in the art for techniques and architectures for detecting a precursor event to cellular attacks over multiple cellular protocols.

There is yet a further need in the art for techniques and architectures for testing a base station router (BSR) in a cellular network.

SUMMARY

The foregoing needs are met, to a great extent, by the application, including systems and techniques for detecting RBSRs across multiple cellular protocols. The foregoing needs are also met by the application, including systems and techniques for identifying the technologies in use by RBSRs across multiple cellular protocols.

One aspect of the patent application is directed to a system of one or more computers configured to perform particular operations or actions by virtue of software, firmware, hardware, or a combination thereof installed on the system that in operation causes or cause the system to perform the actions. One or more computer programs can be configured to perform particular operations or actions by virtue of instructions that, when executed by a data processing apparatus, cause the apparatus to perform the operations or actions. One particular aspect includes an action of detecting an RBSR in a network, including performing a repeated cellular scan across the network. The apparatus also performs the action of collecting broadcast data of BSRs via the scan. Next, the apparatus performs the action of distilling the collected broadcast data into Abstract Syntax Notation One (ASN.1)-encoded system information blocks (SIBs). The ASN.1-encoded SIBs are featurized and subsequently run in an unsupervised machine learning algorithm. The unsupervised machine learning algorithm uses the featurized, encoded SIB data to determine what cells in the PLMN do not exhibit characteristics of native BSRs (i.e., RBSRs). The apparatus further performs the action of calculating a confidence percentage that the device is potentially an RBSR.

In another aspect of the patent application, techniques and architectures for identifying the technologies in use by a detected RBSR in a network are described. Specifically, encoded SIB information about a detected RBSR is received, featurized, and subsequently processed by a supervised machine learning algorithm.

Yet another aspect of the patent application is directed to a system for testing a cellular network including a non-transitory computer-readable media storing instructions for determining if a cellular attack on a communication system is active. The instructions are executed by a processor to perform, for example, detection of a BSR in the communication system via a cellular scan. The processor also performs the action of determining if the BSR in the communication system is an RBSR based upon an unsupervised machine learning algorithm that processes survey data associated with a PLMN in each radio access technology (RAT) of interest. The processor further performs the action of determining if an event directed to cellular connectivity is present in the communication system. The processor even further performs actions of computing a confidence level of an active cellular attack based on reviewed information and determination of the nature of the event. The processor yet even further performs actions of sending a notification to stakeholders of the active cellular attack.

A further aspect of the application is directed to a system including a non-transitory computer-readable media storing instructions for alerting stakeholders of technologies in use by detected RBSRs. The instructions are executed by a processor to perform actions of configuring an algorithm that includes a supervised machine learning algorithm for identifying one or more technologies in use by a detected RBSR. Upon classifying the one or more technologies in use by a detected RBSR, instructions are executed by the processor to alert stakeholders of the one or more technologies in use. By so doing, stakeholders can make informed decisions on how to neutralize the detected RBSR.

Yet even a further aspect of the application is directed to a system including a non-transitory computer-readable media storing instructions for facilitating disablement of cellular radios on stakeholders' cellular devices upon detecting the presence of an RBSR in the network. The instructions are executed by a processor to perform actions of configuring an algorithm that includes an unsupervised machine learning algorithm for detecting RBSRs in a cellular network. Upon RBSR detection, instructions are executed by the processor to alert stakeholders to disable cellular communication on their devices until the RBSR has been neutralized. The processor also executes a supervised machine learning classification algorithm to identify the technologies in use by a detected RBSR.

There has thus been outlined, rather broadly, certain embodiments of the application in order that the detailed description thereof may be better understood, and in order that the present contribution to the art may be better appreciated. There are, of course, additional embodiments of the application that will be described below and that will form the subject matter of the claims appended hereto.

BRIEF DESCRIPTION OF THE DRAWINGS

In order to facilitate a fuller understanding of the application, reference is made to the accompanying drawings, in which like elements are referenced with like numerals. These drawings should not be construed to limit the application and are intended only for illustrative purposes.

FIG. 5 illustrates a graphical user interface (GUI) showing RBSRs detected in a log file according to an aspect of the application.

FIG. 6 illustrates a GUI showing detected RBSRs according to an aspect of the application.

FIG. 8 illustrates a GUI showing encoded cellular broadcast information according to an aspect of the application.

DETAILED DESCRIPTION

Figure 1A:
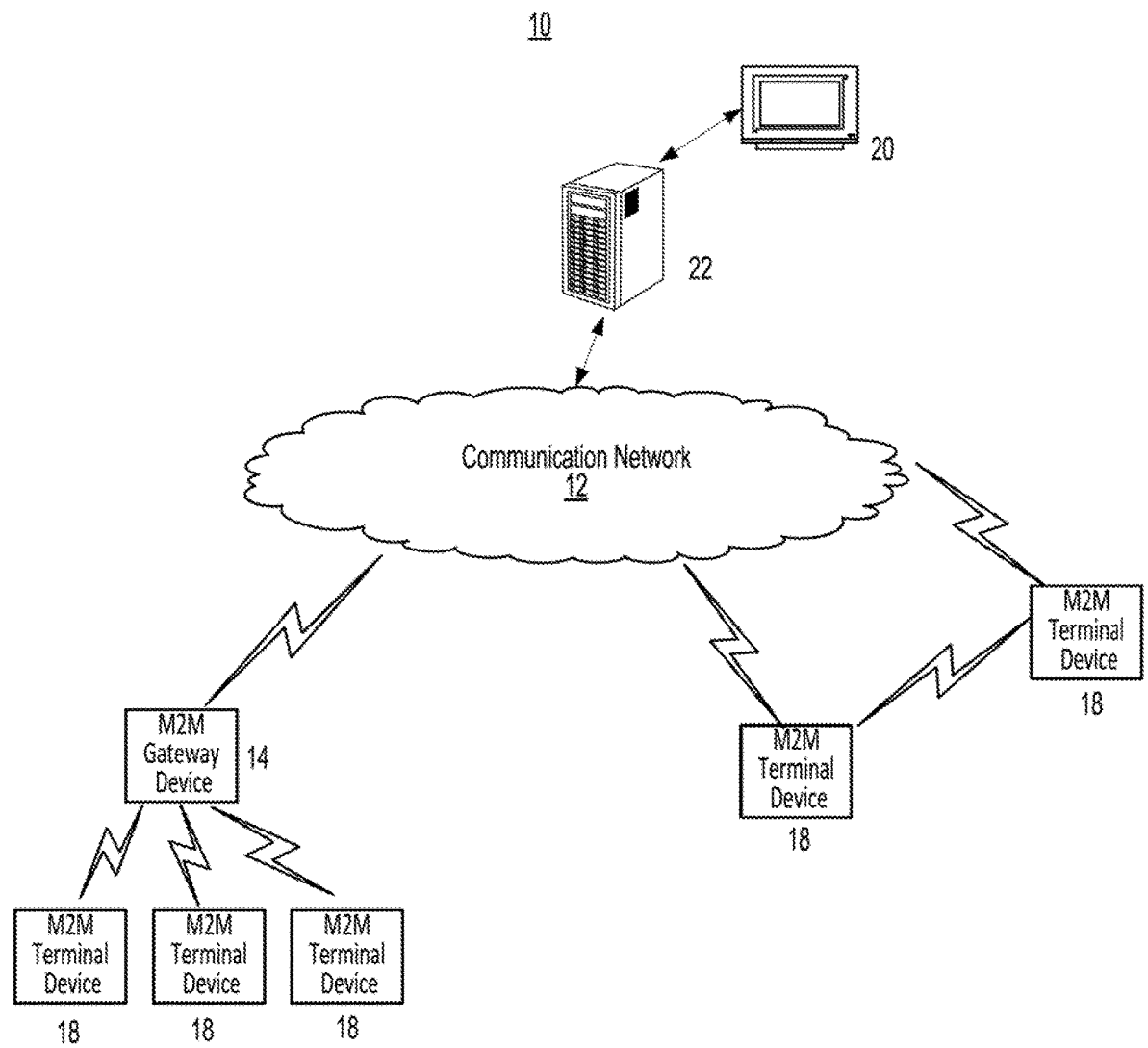
FIG. 1A illustrates a system diagram of an exemplary M2M, IoT, or Web of Things (WoT) communication system in which one or more disclosed embodiments may be implemented.

The application is not limited in its application to the details of construction and to the arrangements of the components set forth in the following description or illustrated in the drawings. The application is capable of embodiments in addition to those described and of being practiced and carried out in various ways. Also, the phraseology and terminology employed herein, as well as in the Abstract, are for the purpose of description and should not be regarded as limiting.

For purposes of this patent application, an RBSR can be interchangeably referred to as a rogue cellular tower. Likewise, a BSR can be interchangeably referred to as a cellular tower.

In a first aspect of the patent application, an architecture is provided including a non-transitory computer-readable media, such as a software application, storing instructions that, when executed by a processor, perform steps to detect RBSRs in a network. The instructions and progress of the steps can be viewed and manipulated via a GUI appearing on a display operably coupled to the processor. In one embodiment, the executed instructions detect malicious or outlier cellular base stations based on encoded system information (SI) wirelessly broadcast therefrom.

According to one embodiment of this aspect, the executed instructions include the steps of running a cellular scan across a region or network. The cellular scan uncovers various survey data for devices in the network including SIBs. The processor executing the instructions processes the survey data to collect encoded SIBs for all cellular BSR devices within radio frequency (RF) range.

In another embodiment of this aspect, a device employs an unsupervised machine learning software algorithm to analyze a set of collected SI broadcast parameters, and triggers alerts/actions when one or more RBSRs is detected. The algorithm, once executed, can analyze sets of collected broadcast parameters by PLMN and by RAT. The machine learning detection algorithm currently operates over 3G and 4G RATs (namely Universal Mobile Telecommunications System (UMTS) and Long-Term Evolution (LTE)). The same methodology can be used to detect rogue UMTS and LTE cellular emitters. The unsupervised machine learning RBSR detection algorithms can also be extended to other protocols (e.g., Code-division Multiple Access (CDMA) and Evolution-Data Optimized EVDO)). When one or more wireless cellular signals is detected as an outlier, it can be reasonably determined that the flagged wireless cellular signals are electronically impersonating a commercial carrier's tower within a commercial cellular network.

In an embodiment, the machine learning detection algorithm implements several unsupervised learning outlier detection techniques. Some of these techniques are known as K-Means, Isolation Forest, and Agglomerative Hierarchical Clustering. By utilizing unsupervised machine learning outlier detection techniques, the machine learning detection algorithms can be used in any geographic area without the need for a-priori information about commercial carriers' native to that region. This also creates a lightweight and portable algorithm that can be run on many different types of machines (from low-power Advanced RISC Machine (ARM) processors to high-powered Intel- or AMD-based processors, and anything in between).

The unsupervised machine learning detection algorithms use broadcast parameters transmitted by cellular carriers to make a determination as to what is "normal" for every commercial cellular carrier scanned within the specified geographic region. The machine learning detection algorithms do not require end-user configuration and are insensitive to normal fluctuations or changes between two cellular towers within a single commercial network carrier. The algorithm capitalizes on the fact that open source and government-sponsored cellular RBSRs are typically incapable of exactly matching the cellular ecosystem. This is due to limitations in the hardware and/or software used by open source and government-sponsored cellular RBSRs. The machine learning detection algorithms flag cells that stick out as being anomalous (with respect to parameters on the broadcast channel (BCH)) within the specified cellular carrier (e.g., AT&T, T-Mobile, etc.).

According to another aspect of the application, the architecture includes a non-transitory computer-readable media, such as a software application, storing instructions that, when executed by a processor, perform steps to identify technologies in use by detected RBSRs in a network. The instructions and progress of the steps can be viewed and manipulated via a GUI appearing on a display operably coupled to the processor. In one embodiment, the executed instructions identify technologies in use by malicious or outlier cellular base stations based on encoded SI wirelessly broadcast therefrom.

In one embodiment of this aspect directed to 'identification,' the supervised machine learning identification algorithms use broadcast parameters transmitted by cellular carriers to make a determination as to what technology (e.g., Open BTS, OpenAirInterfaceLTE, etc.) is in use by a suspected RBSR. The supervised machine learning identification algorithms require offline training prior to deployment. Exemplary ASN.1-encoded SIBs, from each technology the system must be able to identify, are required to train the supervised learning identification algorithms offline. The supervised machine learning identification algorithms exploit knowledge that each software and hardware technology that was or is used to create an RBSR offers only limited end-user configurability. Thus, the supervised machine learning identification algorithms can accurately classify RBSRs using the same underlying technology.

In a subsequent aspect of the patent application, an architecture is described including a non-transitory computer-readable media storing instructions that when executed by a processor perform the steps of detecting that a cellular attack is imminent or presently occurring. The instructions and progress of the detection steps can be viewed and manipulated via a GUI appearing on a display operably coupled to the processor.

In an embodiment, a cellular attack is understood to be underway when the machine learning detection algorithms flag an RBSR and it can be correlated with external events, such as when cellular handsets or systems appear to have cellular access but cannot place phone calls or complete other actions on the cellular network. When the machine learning detection algorithms flag a cellular signal as being rogue, the RBSR detection system can send appropriate alerts and notifications. The alert system can be configured to send alerts via SMS, e-mail, or syslog, which enables oversight and monitoring of remote geographic locations of interest.

Another external event that can be correlated to the detection of an electronically-impersonated cellular tower is a large occurrence of software update requests to commercial cellular handsets. If a rogue tower was detected during a period of mass unplanned or unexpected software update requests, it can be inferred that a cellular attack is underway. In this case, the machine learning algorithms can be used to ensure cellular-user security.

In addition to the natural impact on commercial carrier revenue, the presence of an RBSR can also impact revenue in industries that rely on the end-users' abilities to access the cellular network to request services, place orders, and/or access an internet-connected service. Examples of businesses that could be impacted by the presence of an RBSR include ride-share services (e.g., Lyft and Uber), Google (through add revenue), and internet-connected gambling services currently offered by some casinos. The aforementioned techniques can be used to protect revenue and detect interruptions in end-user cellular service. Upon detecting the presence of an RBSR using the machine learning detection algorithms, businesses and corporations can alert local authorities to locate and eliminate the wireless cellular threat.

In a third aspect of the patent application, an architecture is described including a non-transitory computer-readable media storing instructions that when executed by a processor perform the steps of testing and determining that a BSR is operating within predetermined ranges in a cellular communication system (e.g., not as an RBSR). The software instructions and progress of the detection steps can be viewed and manipulated via a GUI appearing on a display operably coupled to the processor.

The inventive concepts of this application, directed to detecting a rogue device, identifying the technology in use by a detected rogue device, and preventing or minimizing exposure to cyber-attacks within a cellular network, are not considered routine, conventional, or well-understood in the field. Namely, the skilled person would readily consider the invention, and the accompanying claims, to be directed to patent eligible subject matter under the Alice two-step framework. Namely, the inventive concepts are not abstract since they improve the technical field of cyber security by efficiently determining which devices are RBSRs and subsequently identifying the technologies (e.g., Open BTS, OpenAirInterfaceLTE) in use by detected RBSRs. Furthermore, the disclosed systems and techniques can be configured to provide alerts to interested parties or stakeholders, enabling them to act appropriately to prevent or reduce exposure of an imminent or current cyber-attack. The disclosed systems and techniques provide a certain degree of confidence upon analyzing hundreds, perhaps thousands, of devices in a network in a short time period. Moreover, the detection occurs in real-time and may be performed in continuous/repeated mode. In the field of cyber security, every minute of a suspected or current cellular attack is critical. As a result, notifications rapidly are sent to users in the network once a cellular BSR exceeds a predetermined confidence level and is designated as an RBSR. The accuracy and speed at which the analysis and further notification to stakeholders simply cannot be achieved by a human or conventional software.

System Information

Cellular BSRs broadcast information over wireless media to enable user equipment (UE) to communicate with and connect to the BSR. As an example, broadcast information transmitted by LTE cellular BSRs is herein described, although the same or similar information or types of information is applicable with respect to other wireless mediums or protocols. The SI of LTE cellular BSRs is transmitted over the BCH. UE devices receive BCH signaling information on the downlink channel. The three types of BCHs include the broadcast control channel (BCCH), synchronization channel (SCH), and the frequency correction channel (FCCH).

The SI includes a static part and a dynamic part. The static part, referred to as the master information block (MIB), is transmitted using the BCH, and is carried by a physical broadcast channel (PBCH) every 40 ms. The MIB contains information such as channel bandwidth, physical channel hybrid-ARQ indicator channel (PHICH) configuration information, transmit power, number of antennas, and SIB scheduling information transmitted along with other information on the downlink-scheduled channel (DL-SCH).

The dynamic part of SI includes the SIB. The SIB is mapped to radio resource control (RRC) messages (SI-1,2,3,4,5,6,7,8,9,10,11) over the DL-SCH and is transmitted using the physical downlink shared channel (PDSCH) at periodic intervals. For example, SI-1 is transmitted every 80 ms, SI-2 is transmitted every 160 ms, and SI-3 is transmitted every 320 ms.

SIBs are grouped in SI containers. Each SI is composed of multiple SIBs. Each SI will usually have a different transmission frequency and will be sent in a single subframe. SIBs are transmitted using BCCH mapped on DL-SCH, which is in turn mapped on PDSCH. Table 1 below describes the MIB and SIBs in LTE.

TABLE 1

| LTE MIB and SIBs | Description |
| --- | --- |
| MIB | Carries physical layer information of LTE cell, which in turn help receive further SIs, i.e., system bandwidth. |
| SIB1 | Contains information regarding whether or not UE is allowed to access the LTE cell. SIB1 also defines the scheduling of the other SIBs. SIB1 carries a cell ID, mobile country code (MCC), mobile network code (MNC), tracking area code (TAC), and SIB mapping. |
| SIB2 | Carries common channel as well as shared channel information. SIB2 also carries radio resource control (RRC), uplink power control, preamble power ramping, uplink Cyclic Prefix Length, sub-frame hopping, and uplink E-UTRA absolute radio frequency channel number (EARFCN). |
| SIB3 | Carries cell re-selection information as well as Intra frequency cell re-selection information. |
| SIB4 | Carries Intra Frequency Neighbors (on same frequency). Carries serving cell and neighbor cell frequencies required for cell reselection as well as handover between same RAT base stations and different RAT base stations. |
| SIB5 | Carries Inter Frequency Neighbors (on different frequency). Carries E-UTRA LTE frequencies and other neighbor cell frequencies from other RATs. The purpose is cell reselection and handover. |
| SIB6 | Carries wideband code division multiple access (WCDMA) neighbors information, i.e., serving universal terrestrial radio access (UTRA) and neighbor cell frequencies useful for cell re-selection |
| SIB7 | Carries neighbors' information. Used for cell re-selection as well as for handover purposes. |
| SIB8 | Carries CDMA-2000 EVDO frequencies and CDMA-2000 neighbor cell frequencies. |
| SIB9 | Carries Home eNodeB Identifier (HNBID) |
| SIB10 | Carries east west technical services (ETWS) primary notification |
| SIB11 | Carries ETWS secondary notification |

General Architecture

FIG. 1A is a diagram of an example M2M, IoT, or WoT communication system 10 (i.e., labeled as reference indicator 10 in FIG. 1A with a similar format used throughout for other elements in the figures of this application) in which one or more disclosed embodiments may be implemented. Generally, M2M technologies provide building blocks for IoT or WoT systems. Any M2M device, M2M gateway, M2M server, or M2M service platform may be a component or node of an IoT or WoT system as well as an IoT or WoT Service Layer, etc.

As shown in FIG. 1A, the M2M, IoT, or WoT communication system 10 includes a communication network 12. The communication network 12 may be a fixed network (e.g., Ethernet, Fiber, Integrated Services Digital Network (ISDN), Power Line Communication (PLC), or the like), a wireless network (e.g., Wireless Local Area Network (WLAN), cellular, or the like), or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as CDMA, time division multiple access (TDMA), frequency division multiple access (FDMA), orthogonal FDMA (OFDMA), single-carrier FDMA (SC-FDMA), and the like. Further, the communication network 12 may comprise other networks, such as a core network, the Internet, a sensor network, an industrial control network, a personal area network, a fused personal network, a satellite network, a home network, or an enterprise network.

As shown in FIG. 1A, the M2M, IoT, or WoT communication system 10 may include M2M gateway devices 14 and M2M terminal devices 18. It will be appreciated that any number of M2M Gateway Devices 14 and M2M terminal devices 18 may be included in the M2M, IoT, WoT communication system 10 as desired. Each of the M2M gateway devices 14 and M2M Terminal devices 18 are configured to transmit and receive signals, such as via communications circuitry, the communication network 12, or direct radio link. An M2M gateway device 14 allows wireless M2M devices (e.g., cellular and non-cellular) as well as fixed network M2M devices (e.g., PLC) to communicate either through operator networks, such as the communication network 12, or the direct radio link. For example, the M2M terminal devices 18 may collect data and send the data, via the communication network 12 or direct radio link, to an M2M application 20 or other M2M terminal device 18. The M2M terminal devices 18 may also receive data from the M2M application 20 or another M2M terminal device 18. In a further embodiment, data and signals may be sent to and received from the M2M application 20 via an M2M Service Layer 22, as described below. M2M terminal devices 18 and M2M gateway devices 14 may communicate via various networks including, for example, cellular, WLAN, Wireless Personal Area Network (WPAN) (e.g., Zigbee, 6LoWPAN, Bluetooth), direct radio link, and wireline. Exemplary M2M terminal devices 18 that could be impacted by the presence of an RBSR include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 1B:
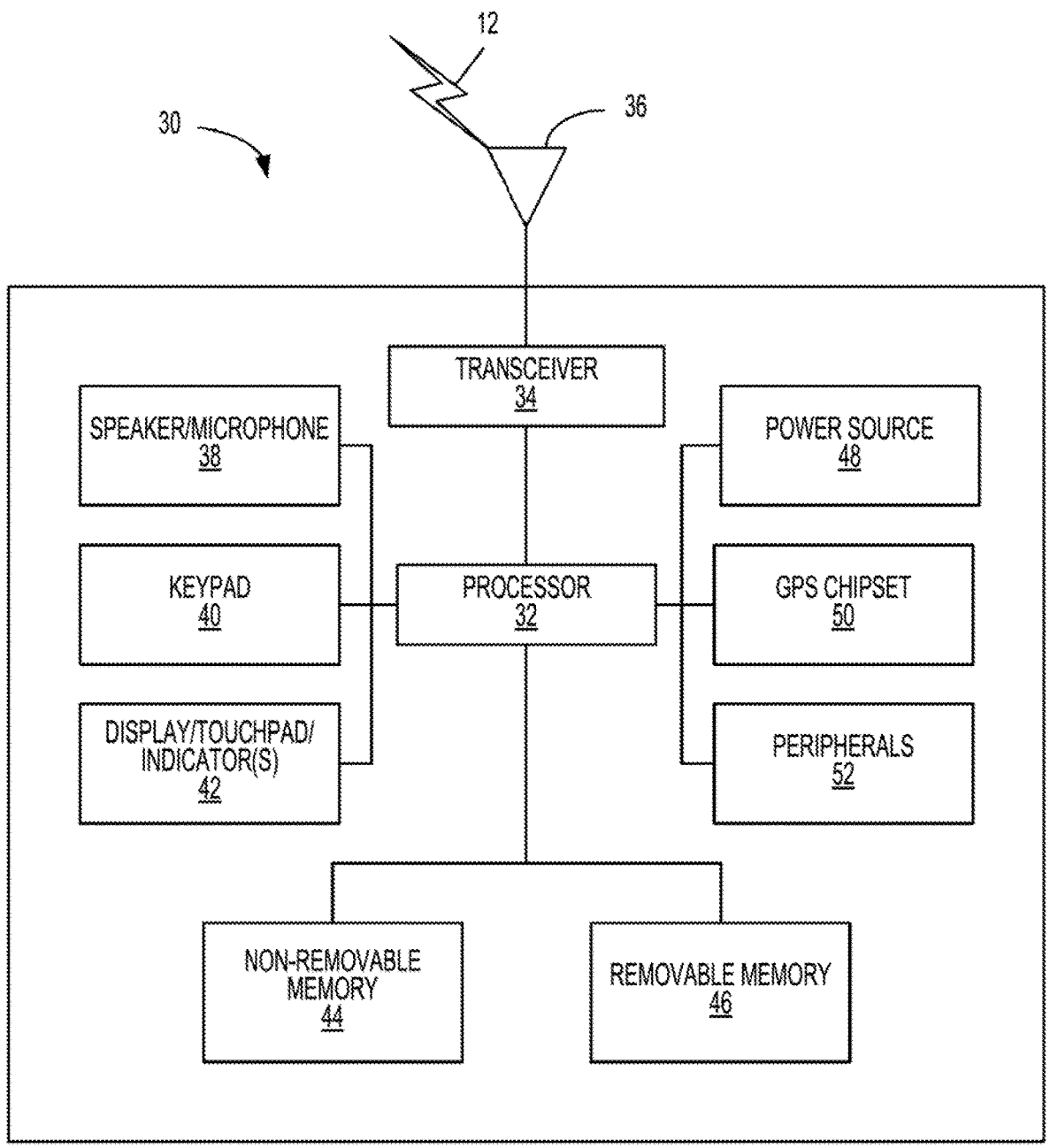
FIG. 1B illustrates a system diagram of an exemplary communication network node.

FIG. 1B is a block diagram of an exemplary hardware/software architecture of a node 30 of a network, such as clients, servers, or proxies, which may operate as an M2M server, gateway, device, or other node in an M2M network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations, such as authentication, security key agreement, and/or cryptographic operations. The security operations may be performed, for example, at the access layer and/or application layer.

As shown in FIG. 1B, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including M2M servers, gateways, wireless devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1B as a single element, the node 30 may include any number of transmit/receive elements 36. More specifically, the node 30 may employ multiple-input and multiple-output (MIMO) technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as Universal Terrestrial Radio Access (UTRA) and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, and a vehicle, such as a car, truck, train, or airplane. The node 30 may connect to other components, modules, or systems of such apparatuses or devices via one or more interconnect interfaces, such as an interconnect interface that may comprise one of the peripherals 52.

Figure 1C:
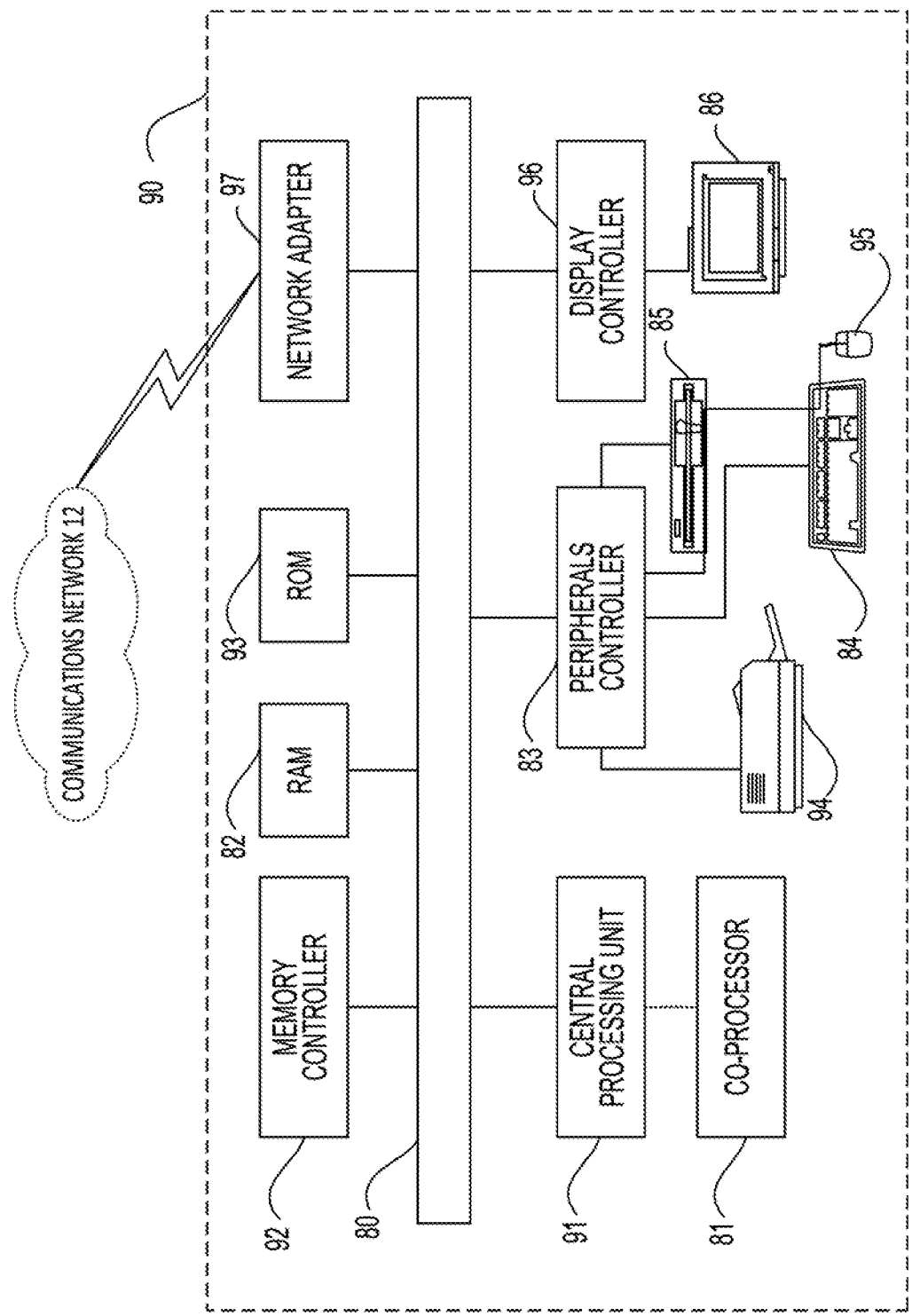
FIG. 1C illustrates a block diagram of an exemplary computing system.

FIG. 1C is a block diagram of an exemplary computing system 90 that may also be used to implement one or more nodes (e.g., clients, servers, or proxies) of a network, which may operate as an M2M server, gateway, device, or other node in an M2M network.

The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may contain communication circuitry, such as a network adaptor 97, that may be used to connect the computing system 90 to an external communications network, such as the communication network 12 of FIG. 1A, to enable the computing system 90 to communicate with other nodes of the network.

RBSR Detection in a Cellular Network

Figure 2A:
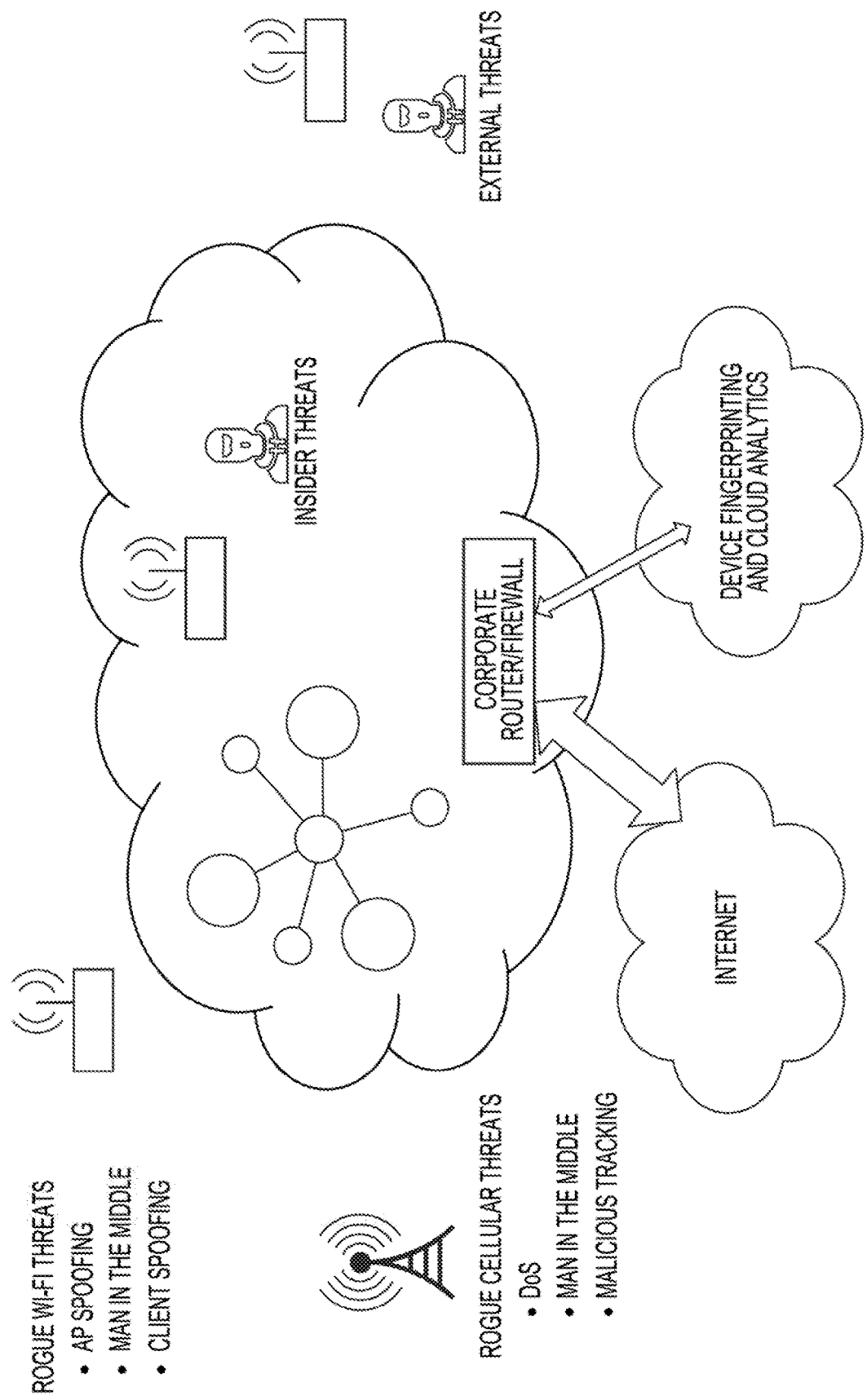
FIG. 2A illustrates a wireless threat landscape.

A wireless threat landscape is depicted in FIG. 2A. Specifically, the threats may come from either inside or outside of the network. Outside threats may include rogue Wi-Fi threats and rogue cellular threats. The rogue cellular threats may occur via a man-in-the-middle (MITM) attack whereby the attacker secretly relays and possibly alters the communication between two parties who believe they are directly communicating with each other. One example is active eavesdropping, in which the attacker makes independent connections with the victims and relays messages between them to make them believe they are talking directly to each other over a private connection. Unfortunately, the conversation is controlled by the attacker. The attacker must be able to intercept all relevant messages passing between the two victims and inject new ones.

Rogue cellular threats may include Denial-of-Service (DoS) wherein the perpetrator seeks to make a machine or network resource unavailable to its intended users by temporarily or indefinitely disrupting services of a host connected to the network. Denial of service is typically accomplished by flooding the targeted machine or resource with superfluous requests in an attempt to overload systems and prevent some or all legitimate requests from being fulfilled. In a distributed denial-of-service attack (DDoS attack), the incoming traffic flooding the victim originates from many different sources. This effectively makes it impossible to stop the attack simply by blocking a single source. A DoS or DDoS attack is analogous to a group of people crowding the entry door of a shop, making it hard for legitimate customers to enter, and thus disrupting trade.

Figure 2B:
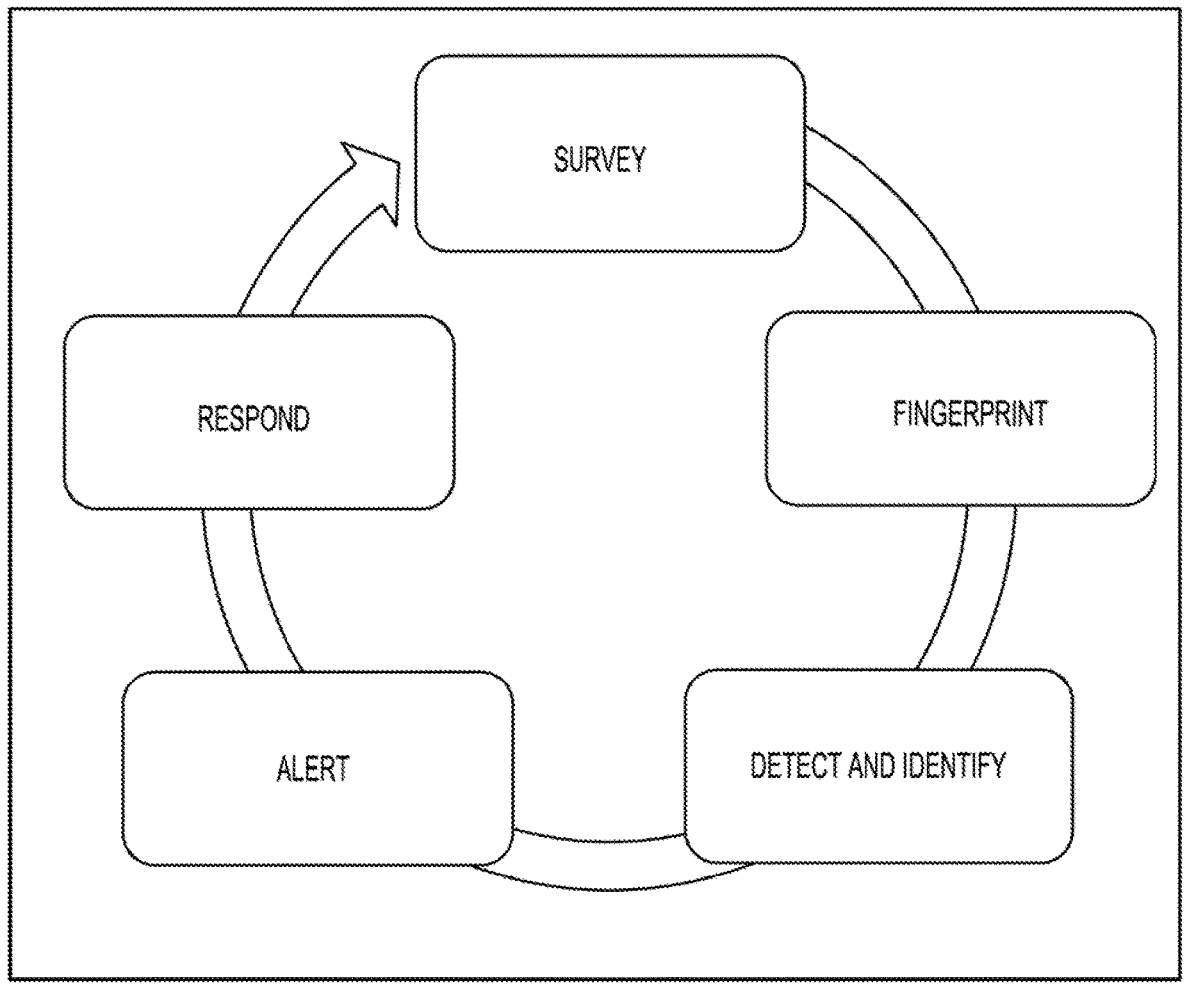
FIG. 2B illustrates a threat monitoring cycle for an RBSR detection and identification application.

According to one aspect of the patent application, FIG. 2B illustrates a general flow for an RBSR detection and identification software application. Moving clockwise beginning at noon in FIG. 2B, the software application persistently surveys, analyzes, and fingerprints wireless RF survey data. The system processes the RF data from each cellular tower. The RF data is distilled into raw ASN.1-encoded SI broadcast message BCH blocks. Select ASN.1-encoded SIBs are featurized for use by the unsupervised machine learning RBSR detection algorithm to flag anomalous cells. The machine learning RBSR detection algorithm processes survey data by network carrier (e.g., AT&T, T-Mobile, etc.) and technology (i.e., UMTS and LTE). The machine learning RBSR detection algorithm is then used to flag anomalous cells for each PLMN in each RAT.

Upon rogue detection, the application alerts users with a variety of configurable notification options, such as push alerts to a browser, SMS, email, or via syslog.

Next in FIG. 2B, when an anomalous cell is flagged by the machine learning detection algorithm (or any other algorithm in use by the detection system), the supervised machine learning identification algorithm is executed. Specifically, the supervised machine learning identification algorithm uses classification techniques, such as support vector machines and neural networks, to classify the technology in use by the anomalous cell (e.g., OpenBTS, OpenAirInterfaceLTE, etc.). The supervised machine learning techniques operate on featurized ASN.1-encoded BCH blocks. They must be trained prior to deployment. It is a prerequisite that the supervised machine learning identification algorithms become trained with multiple SI BCH blocks from each base technology that the system must ultimately be able to classify.

Next in FIG. 2B, based upon one or more algorithms, the software application detects malicious or outlier cellular base stations based on layer three wireless broadcast information transmitted by cellular BSRs. An example of layer three broadcast information includes cell parameters, such as random access channel (RACH) configuration, neighbor list contents, or how many antennas are in use. After detecting one or more RBSRs, the software application alerts subscribed parties of an attack. This helps stakeholders become more vigilant with regard to future cellular transmissions and receptions on the cellular network. Further, the software application can be configured to alert an appropriate agency of the RBSRs' illegal activities.

Figure 3:
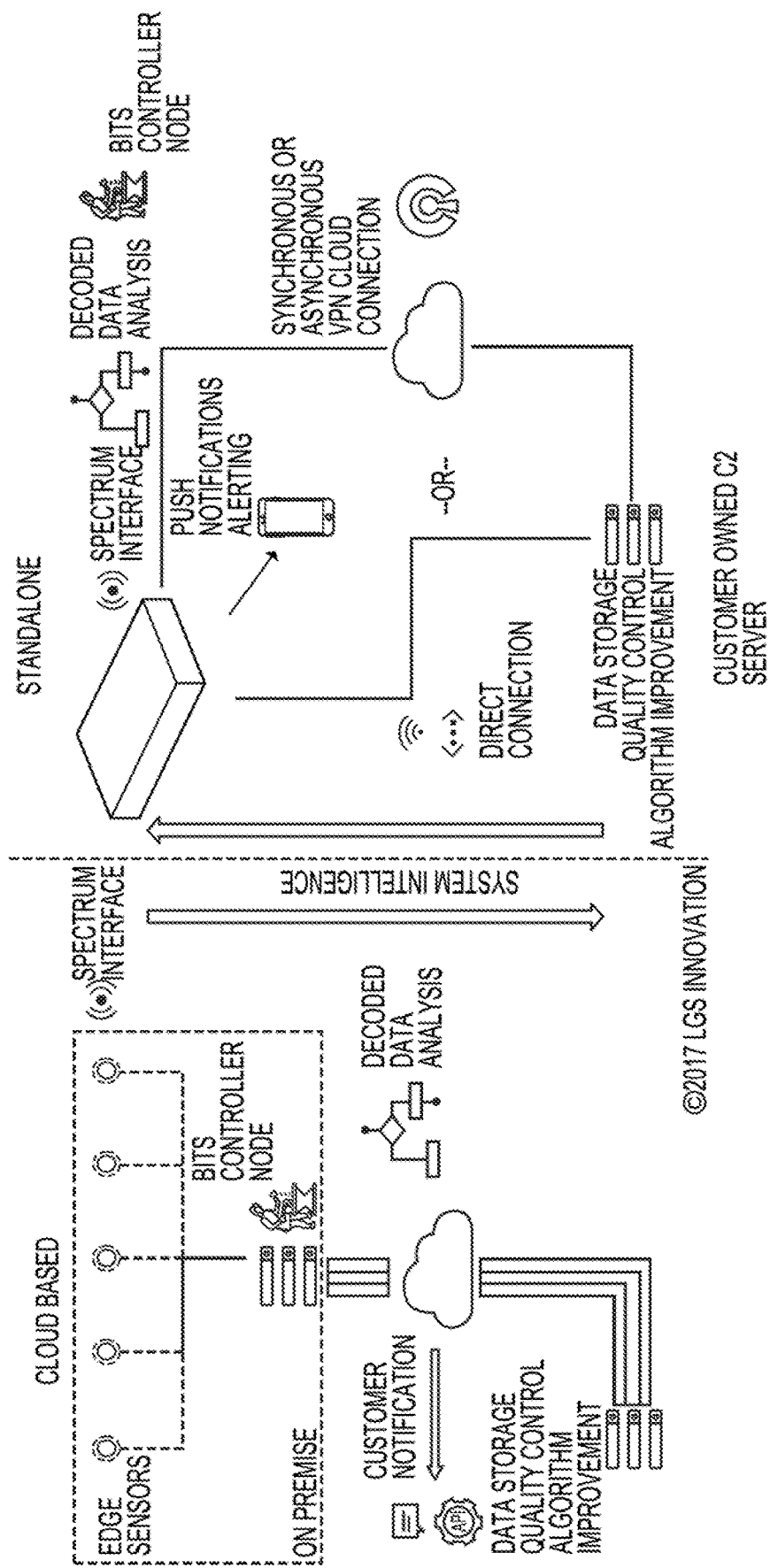
FIG. 3 illustrates cloud-based and standalone architectures for an RBSR detection and identification application according to an aspect of the application.

According to another aspect of the patent application, FIG. 3 illustrates an RBSR detection and identification system. As shown, the left side of FIG. 3 describes a cloud-based infrastructure, and the right side describes a standalone infrastructure. In the standalone architecture, the RBSR detection and identification system includes all the hardware and software required to run the full suite of detection algorithms locally. The standalone architecture is suitable for mobile operations and facilities that do not prefer cloud connections to their infrastructure. In such an implementation, each detector node must have all of the required hardware and software.

The cloud implementation is based on a local network of edge nodes that possess basic RF cellular survey capabilities and the ability to communicate to the Internet. Specifically, the cloud architecture includes lower-cost edge nodes that do not have the required hardware and software to make RBSR determinations in isolation. The cloud architecture can offload tasks performed at nodes in the standalone case (namely cellular RF scan and machine learning RBSR detection and identification) to a central node. In the cloud architecture, RF survey data is passed from edge nodes to a local server that can perform filtering before forwarding the necessary data to a cloud instance where all RBSR detection and identification algorithms reside. In the cloud architecture, the machine learning algorithms can utilize data collected from geographically diverse locations to perform deeper analytics.

Figure 4:
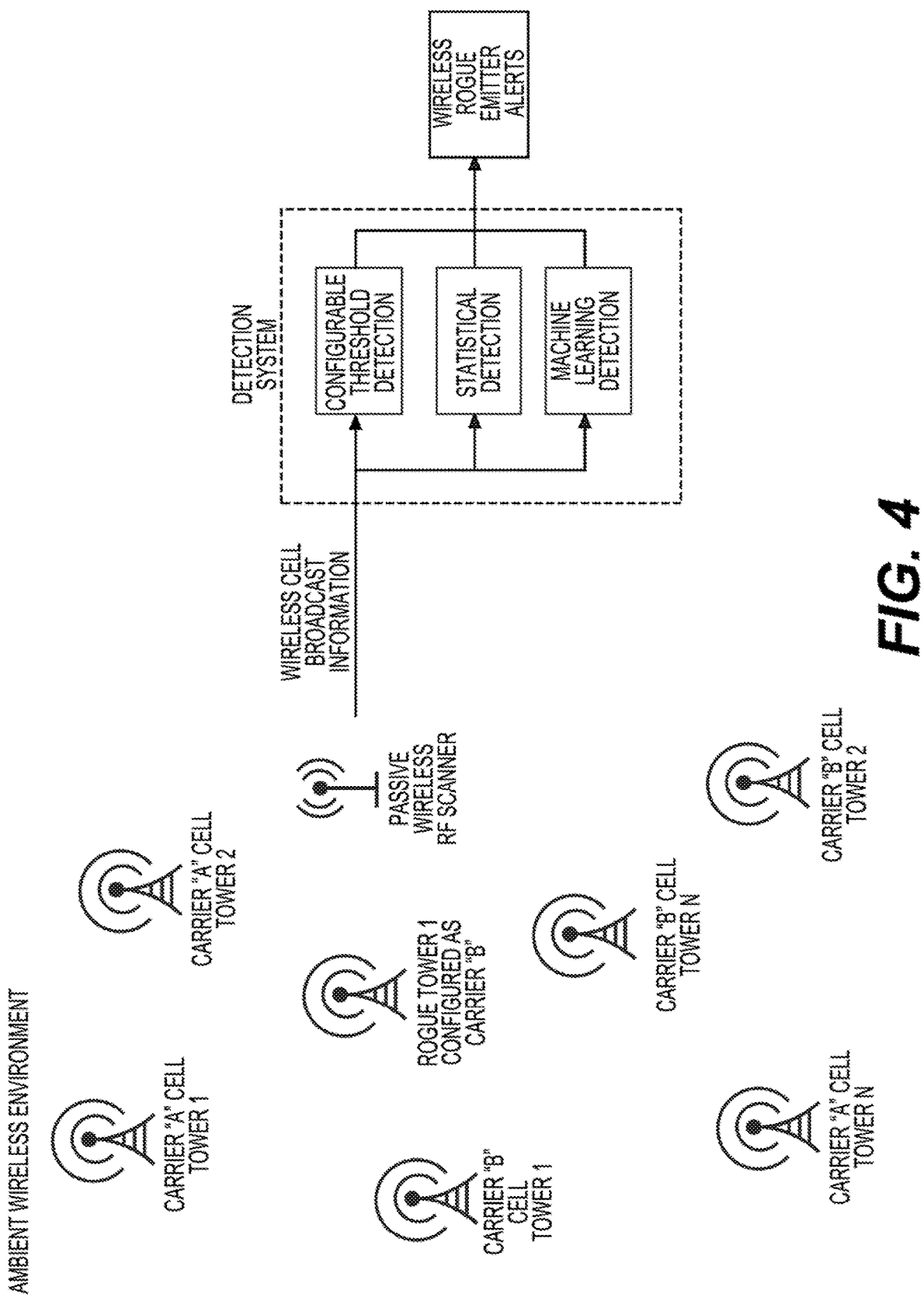
FIG. 4 illustrates a cellular environment with an RBSR present along with the detection and identification application ingesting cellular data from the cellular environment according to an aspect of the application.

FIG. 4 illustrates a use case embodiment for detecting an RBSR in an ambient wireless environment. In this exemplarily embodiment, an unsupervised machine learning detection algorithm is utilized by the processor of an apparatus to execute instructions. In another embodiment, the unsupervised machine learning detection algorithm may be used in conjunction with a statistical detection algorithm, a configurable threshold algorithm, and other algorithms in determining a confidence level of a suspected base station cellular tower being an RBSR.

As shown in FIG. 4, the detection system is a passive wireless RF scanner (i.e., transceiver) capable of detecting signals in the ambient wireless environment. In this embodiment, a rogue "Rogue Tower 1" has been intentionally introduced, for discussion purposes, into a commercial cellular broadcast environment and has been configured to electronically impersonate Carrier B's Cell Tower 1. This impersonation is observed by analyzing the information that all towers in Carrier B wirelessly broadcast and comparing it (via an unsupervised anomaly detection algorithm) with the information that the rogue cell tower (i.e., Rogue Tower 1) wirelessly broadcasts. Many parameters between Carrier B's Cell Tower 1 and Rogue Tower 1 will be in common, and the network scan may only be able to see Rogue Tower 1 (if the RBSR is configured to optimally operate within the wireless landscape). The single parameter that is guaranteed to be the same between Carrier B's Cell Tower 1 and Rogue Tower 1 is Carrier B's (i.e., a commercial carrier's) unique PLMN code used to distinguish network carriers (e.g., distinguish AT&T from Verizon). Many other parameters between the two towers (legitimate Cell Tower 1 and imposter Rogue Tower 1) will match exactly; however, due to software and hardware limitations, there are some parameters that will naturally vary between the two cells.

FIG. 5 illustrates a GUI on a display. The GUI presents a detection log of all detected cellular towers (i.e., BSRs) in an ambient environment. The detection log includes dropdowns for Anomalous Cells (which activates the GUI shown in FIG. 6), Settings and Developer Settings. The columns of the detection log include a column indicating a confidence level, associated with the corresponding cellular tower, that is based upon one or more predetermined criteria and one or more included algorithmic approaches. The detection log further includes columns indicating a cellular tower's Global Cell Identifier (GCI), RAT, associated triggers, channel/code, signal strength, and the last time that the cellular tower was seen on the network. Specifically, the confidence level is a percentage ranging from 0-100%. For example, the cellular tower in the first row indicates a confidence level of 30% that this cellular tower may be an RBSR and is based upon the machine learning algorithm's findings. For this cellular tower, the RAT is LTE, and it was last seen 2 hours ago. It is envisaged that the detection architecture continuously scans and runs updates in the ambient environment in real-time, which, in turn, allows the confidence level to be updated in real-time. By so doing, the system continuously checks for rogue devices to avoid false positives or negatives.

FIG. 5 also shows a notification in the GUI indicating that an RBSR is detected. The notification may be configured such that it appears at the first instance of a new RBSR exceeding a predetermined confidence level. Alternatively, the notification may appear periodically for every RBSR that continues to exceed a predetermined confidence level.

FIG. 6 illustrates a GUI of the detection system on a display. The GUI may be activated by selection of the Anomalous Cells dropdown item shown in FIG. 5 and presents a log generated by the RBSR detection and identification application. The log details which cellular towers (i.e., BSRs) were flagged as being potential RBSRs (i.e., anomalous BSRs). Notably, the generated log shows the level of confidence and the triggered algorithms, which indicate the degree to which the potential rogue is believed to be an RBSR. The GCI can be used to track the cell tower in a repeated iterative cellular survey to get more cell information as needed. The application also displays a recording of the time that the suspected rogue was initially and last seen. In so doing, events can be reconstructed over time, exported to other analysis tools, and archived.

Figure 7:
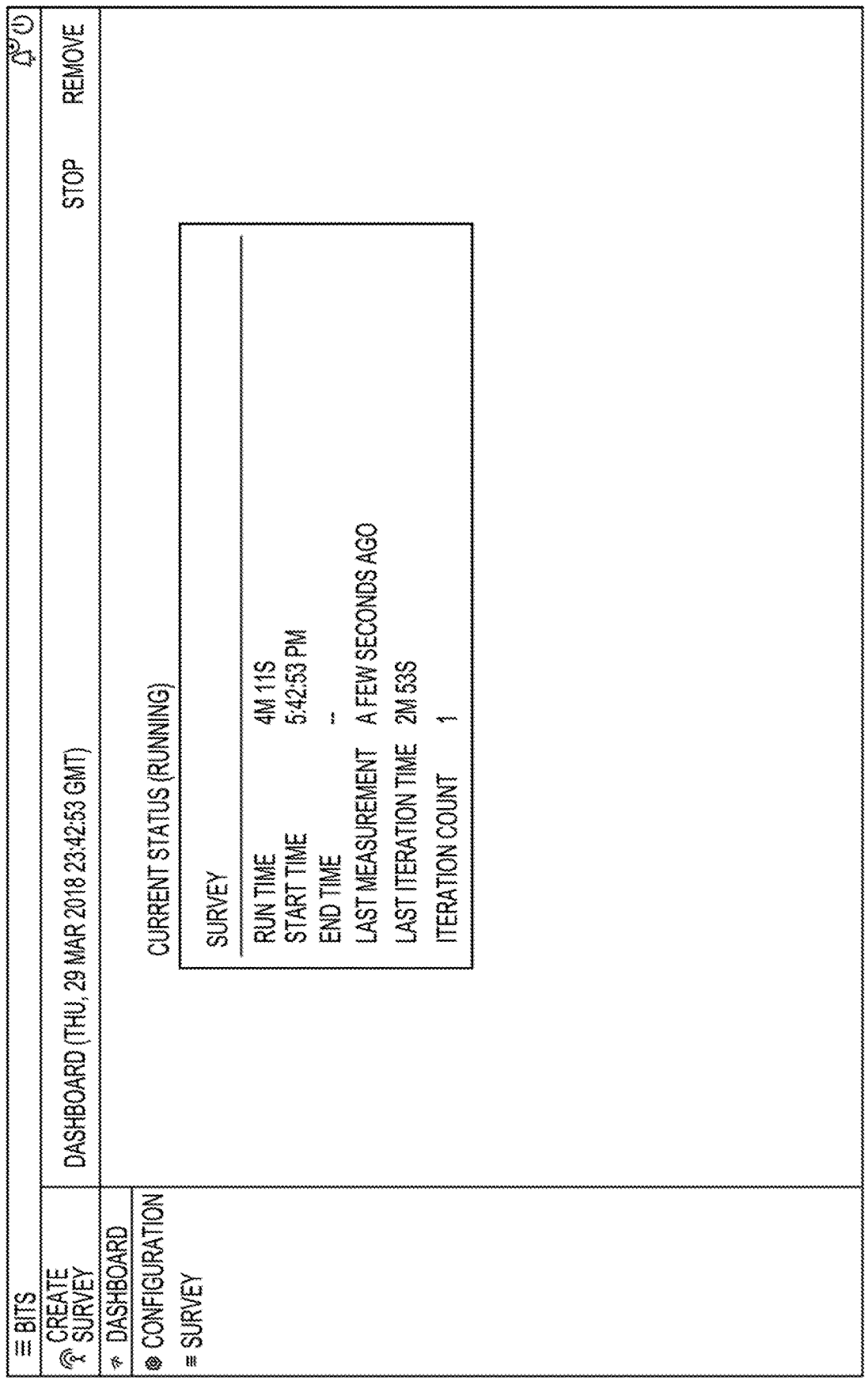
FIG. 7 illustrates a GUI showing a network survey of cellular network towers according to an aspect of the application.

FIG. 7 illustrates a GUI of the detection system on a display. The GUI presents a cellular survey of the cellular towers (i.e., BSRs) in the network. Here, the dashboard gives the date and time of the cellular survey. The GUI depicts a scan that is currently running. Specifically, the cellular survey has been running for 4 minutes and 11 seconds before a present time. The cellular survey began at 5:42:53 PM and the last measurement was several seconds prior to the present time. The last iteration time was 2 minutes and 53 seconds prior to the present time. The iteration count is 1.

FIG. 8 illustrates a GUI of the detection system on a display. The GUI presents encoded cellular broadcast information for a cellular tower, such as one of the cellular towers indicated in FIGS. 4-6. In this instance, the cell information indicates that the carrier is AT&T with a PLMN of 310410. The RAT is UMTS and the band is band 2-1900-PCS A-F. This broadcast information can be obtained, for example, with free software applications and low-cost hardware, public databases, and COTS or custom application-specific devices.

The GUI of the detection system on a display as shown in FIG. 8 also provides a BA-List, Intra Frequency Cells, Inter Rat Cells, and SIBs. As depicted, Intra Frequency Cells include 1 item in its dropdown, while SIBs include 7 items in its dropdown. The 7 items in the SIBs dropdown includes encoded SIBs 1, 2, 3, 5, 7 and 11 and an encoded MIB.

Figure 9:
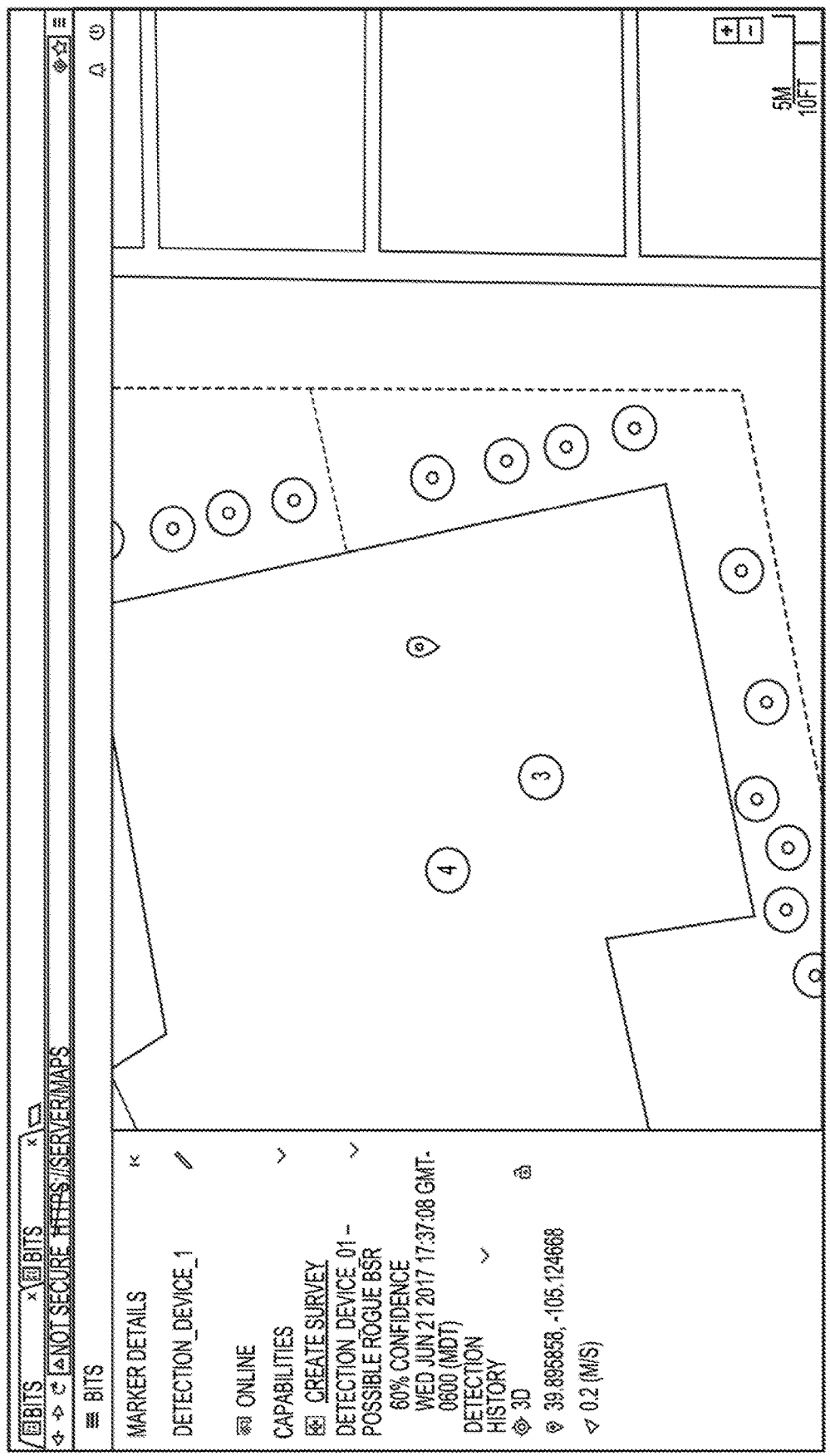
FIG. 9 illustrates a GUI showing a mapped, potential RBSR according to an aspect of the application.

FIG. 9 illustrates an exemplary embodiment where a GUI on a display illustrates an RBSR in an environment. The left side of the GUI provides capabilities including, but not limited to, creating a network monitor survey and viewing a potential RBSR with confidence levels. The left side of the GUI also provides detection history and positioning of a potential RBSR.

Figure 10:
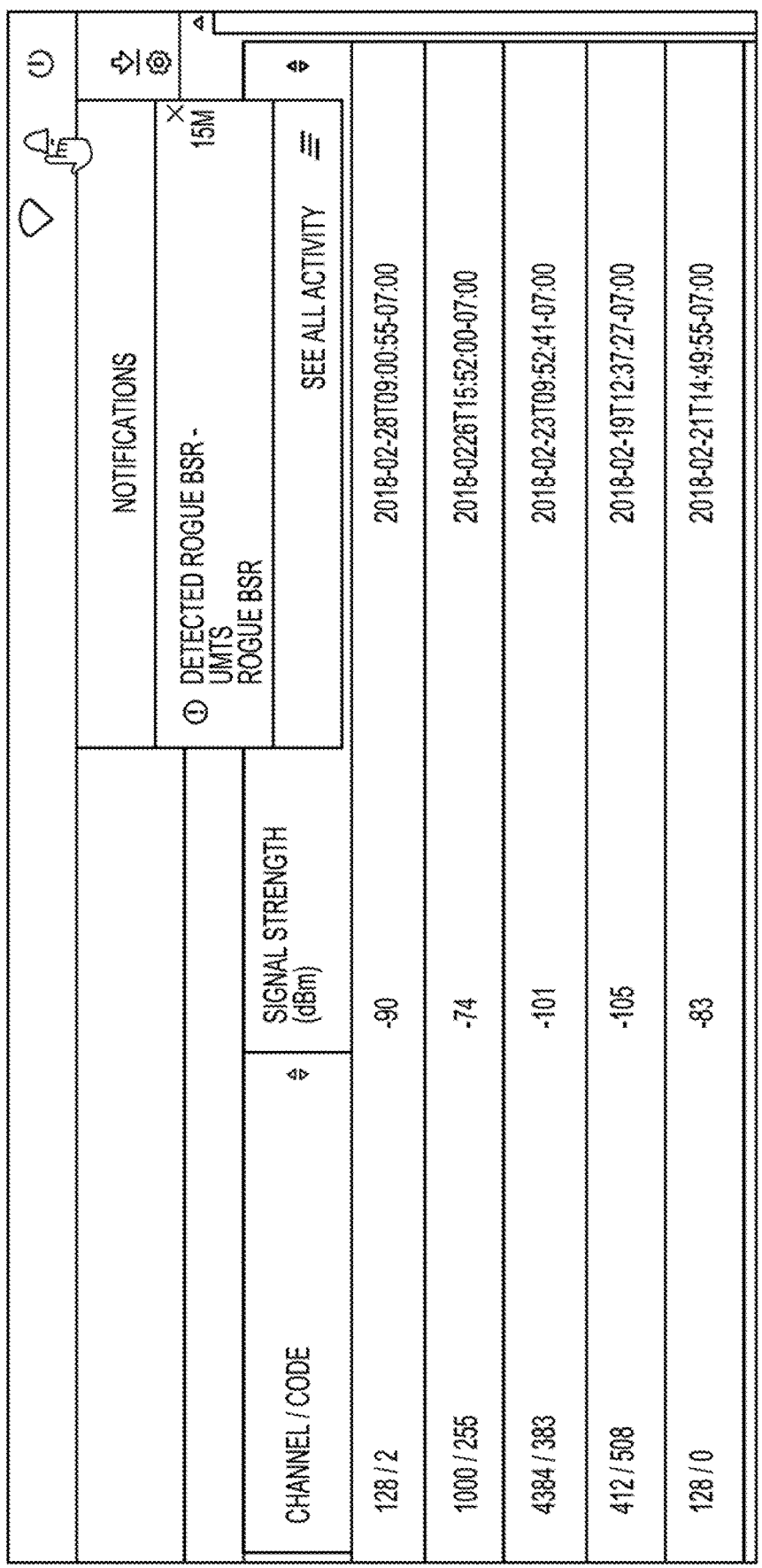
FIG. 10 illustrates a GUI showing a notification of an RBSR according to an aspect of the application.

According to another aspect of this patent application, FIG. 10 depicts a GUI on a display. The GUI indicates notifications to users that a particular device/BSR exhibits characteristics of an RBSR. In this example, an unsupervised machine learning software algorithm can analyze a set of collected broadcast parameters, trigger alerts, or indications of other actions when one or more BSRs is anomalous when compared to the other commercial cells within the network scan, or when known commercial (e.g., predetermined) parameters are not present at all in the collection relative to like-carrier peers. The knowledge of which collected parameter values are anomalous and how the thresholds should therefore be configured can be the result of a priori knowledge, statistical analysis, or other algorithms. When one or more out-of-bounds or absent parameters occur within a complete collection of a given cellular tower's broadcast information and that broadcast information has some similar parameters to a commercial carrier, it can be reasonably determined that it is potentially electronically impersonating a commercial carrier's cellular tower on the cellular network.

Detecting a Precursor to a Cellular Network Attack

According to another aspect of the patent application, an attack on a cellular communication system is typically preceded by detecting one or more RBSRs in the system. As discussed above, the RBSRs can be configured with inexpensive hardware and open source software and can be configured to electronically impersonate authentic BSRs in the cellular network. The RBSRs also can be concealed, such as in a backpack with a battery, and introduced into the RF cellular ecosystem. The methods for detecting an RBSR are described above in significant detail.

The target cellular systems can span a wide variety of device types such as personal and business handsets and M2M communication links, as illustrated in FIG. 1A. The types of cellular attack can range from a basic DoS to more advanced attacks such as MITM snooping and impersonating, unwarranted location tracking, and malware injection into connected clients. These attacks affect public safety, critical infrastructure stability, and revenue for businesses.

According to an embodiment, when an RBSR detection and identification system detects an electronically-impersonated commercial cellular tower, and the detection is correlated with external events (e.g., cellular handsets or systems that cannot get service), the detection system can run advanced analytics to evaluate whether a cellular attack is underway. The advanced analytics may be helpful in discerning true threats from network issues, such as for example, a network operator experiencing technical difficulties. According to another embodiment, a large occurrence of unplanned software update requests to commercial cellular handsets can be indicative of cellular attack in the presence of a detected rogue tower or RBSR. When the detection system determines the cellular attack is underway, appropriate alerts and notifications may be sent to users in the system in accordance with the measures discussed earlier.

In an exemplary embodiment, an architecture is described as including a non-transitory computer-readable media having instructions for determining if a cellular attack on a communication system is occurring or is imminent. The instructions can be executed by a processor to determine whether a router or cellular tower in the communication system is rogue in view of being flagged as an anomalous cell by the unsupervised machine learning algorithms. Another executed instruction includes determining if an external event exhibiting a characteristic of a cellular attack is occurring in the communication system. Yet another executed instruction includes computing a confidence level of a cellular attack in view of the determined rogue router or cellular tower and the external event. Yet another executed instruction includes sending a notification to all subscribed users in the communication system that a cellular attack is currently taking place.

Cellular Network Testing

According to yet another aspect of the patent application, the detection system can be used to ensure a true commercial cellular BSR does not broadcast parameters that are seen as anomalous by the machine learning RBSR detection algorithm. This technique may be employed during development and testing of a new BSR system, when software loads are continuously iterated. The detection system serves as an automated notification platform that alerts developers when the BSR is broadcasting anomalous or unplanned broadcast information.

In one embodiment, an architecture is described that includes a non-transitory computer-readable media storing instructions that, when executed by a processor, perform aspects for determining whether a BSR's broadcast parameters are anomalous in a cellular communication system and flagging that BSR as an RBSR (i.e., determining if a BSR's broadcast parameters are native to the cellular ecosystem). One of the executable instructions includes configuring what broadcast messages (e.g., SIB1, 2, etc.) to evaluate within the unsupervised machine learning algorithm to determine if the BSR appears rogue when compared to the rest of the cellular ecosystem (according to this embodiment, this parameter is only exposed in the cellular network testing use case; in all automated RBSR detection use cases, the algorithm is tailored to use SIBs or parts of SIBs based on a priori statistical analysis). Another executable instruction includes evaluating information of the BSR in view of the ambient cellular ecosystem. Another executable instruction includes determining if the BSR is operating out of range using an algorithm providing confidence weights for the predetermined criteria falling outside of the acceptable range. Yet another executable instruction includes notifying an administrator of the BSR appearing to be anomalous. Yet a further executable instruction includes providing updated parameter settings to enable the commercial carrier associated with the BSR to configure the BSR to fall within acceptable range of the predetermined criteria. The above-mentioned steps can be reiterated as necessary to ensure the BSR is acceptable for use in the communication system.

In a further embodiment, an RBSR detection system with unsupervised machine learning algorithms can be used to augment other algorithms or techniques that have the same or similar purpose, such as approaches having greater manual aspects, including the procedural approach and similarly automated statistical approaches. A basic augmentation implementation would include a voting scheme such that the final confidence level corresponding to the algorithmic belief that a given BSR is operating within acceptable ranges with respect to various criteria such that the BSR does not appear to be rogue.

Detecting Illegal Cellular Broadcast Activity

According to yet a further aspect of the application, an outlier tower detected based on predetermined criteria may not always be a precursor of a cellular attack. That is, if the confidence level has been met, the BSR may be an inadvertent, yet illegal, configuration by a legitimate commercial carrier. Alternatively, the BSR or cellular tower could be the result of a researcher who accidentally configured a BSR to broadcast as a commercial carrier. Since the activity may violate certain laws and potentially disrupt public communication and safety, a notification may be sent to the appropriate authorities by the system. By surveying the cellular environment and using the unsupervised machine learning detection algorithms on predetermined encoded broadcast messages, the algorithms can be used to detect such an ill-actor, and could serve as a tool by local and federal law enforcement to help ensure civilian safety.

Protection of Military Communication Systems

According to another embodiment of the application, the machine learning detection algorithms described herein may find use in protection of communication systems (e.g., a cellular or otherwise wireless communication system) used by a military force, particularly when such military force is on active deployment or in proximity to hostile forces. An example communication system that may be vulnerable to wireless threats (e.g., an RBSR) may include a field system configured to track and identify deployed military forces (also referred to as a "blue force" tracking system). The machine learning detection algorithms can be applied to protect a military force's communication systems during military operations and thereby minimize threats to the communication systems and wireless communication components thereof from MITM attacks, tracking, malware injection, interruption in service attacks, and the like (each of which could be critically detrimental to the success of the military operation). In this scenario, when the machine learning detection algorithms flag a BSR as potentially rogue, the algorithms can report the potential rogue to the greater RBSR detection system, which can calculate the final confidence that this specific BSR is a rogue. In making this calculation, the RBSR detection system can take into account the output from other algorithms that may have been selected to run upon the same survey data. If the final confidence exceeds a specified threshold, the system can flag a BSR as an RBSR, and alerts/actions can be set up to protect the communication systems of the associated military force.

The RBSR detection system can be configured to alert the associated military forces and personnel of the RBSR's presence and/or proactively take action to protect the military forces and personnel from danger brought on by cellular or other wireless attacks. For example, the cellular radio on all or some wireless components of the military force's communication systems may be disabled until the RBSR has been neutralized. As a result, the military force's communication systems are protected from MITM attacks, tracking, malware injection, and the like. Technologies to move communication to an alternate protocol and/or a different cellular network may tie into the alert system to ensure that communication systems of the military force are maintained and secure.

Rogue Detection with Machine Learning Algorithms

According to a further aspect of the application, the machine learning RBSR detection algorithms utilize select layer three cellular broadcast messages as inputs into unsupervised learning techniques to detect and identify RBSRs. An example of layer three broadcast information used by the machine learning detection and identification algorithms may include neighbor contents and specification revision. Unsupervised machine learning algorithms used by the detection algorithms include k-means clustering, agglomerative hierarchical clustering, and isolation forest anomaly detection algorithms. These algorithms take in ASN.1-encoded layer three broadcast packets, featurize the encoded data, and run unsupervised anomaly detection algorithms on all cells in a given PLMN for each RAT.

To featurize the ASN.1-encoded SIBs, the algorithms create N features for each SIB of interest, where N is the number of bytes in the largest encoded SIB hex string. For example, if the encoded SIB hex string for cell A's SIB 1 is 0x1234, and the encoded SIB hex string for cell B's SIB 1 is 0x123456, the number of features the unsupervised machine learning algorithm would use to analyze only SIB1 would be 3, and the features for cell A would be 0x12, 0x34, and 0x00, while the features for cell B would be 0x12, 0x34, and 0x56. Data is featurized across all SIBs of interest for all cells in a network. The featurized data is fed into the unsupervised machine learning algorithms to detect what cells are anomalous when compared to all of the other cells in the network scan. Any cell that is not native to the commercial carrier network is flagged as an anomalous cell by the unsupervised machine learning algorithm.

Broadcast Channel Anomaly Detection

According to another embodiment, the unsupervised machine learning RBSR detection algorithms do not require a priori knowledge about the commercial carriers in a given geographic area nor do they require extensive time-lapse survey. The algorithms operate on a single scan and have a precision rate of 100% on all available test data, including all available open source cellular stacks. The RBSR detection system currently implements unsupervised machine learning anomaly detection techniques for UMTS and LTE signal sets. The RBSR detection system could be extended to include anomaly detection techniques for other signal sets (e.g., CDMA) as well.

The UMTS k-means machine learning RBSR detection algorithm processes a single commercial carrier at a time. The algorithm receives encoded SIBs 1, 3, and 5, featurizes the encoded data, and inputs the data byte by byte into a k-means algorithm with k=2. We insert (i.e., bootstrap) a known rogue cell into the input data. In this way, there will always be two centroids within the k-means algorithm. If there is a rogue cell in the scanned data, the centroid with the known rogue cellular data will have two cells (the known rogue cell and the single rogue cell in the ambient environment). If there are no rogue cells in the scanned data, the centroid with the known rogue cell will comprise a single cell, signifying that there are no rogue cells within the ambient cellular scan.

In using SIBs 1, 3, and 5, cell features such as specification revision, number of RACH channels, RACH channel configuration, and broadcast message schedule are taken into consideration when running the k-means machine learning RBSR detection algorithm. In most cases, we have found that using only SIB 5 is enough to produce an accurate anomaly detection algorithm for the UMTS protocol. This is because most rogue UMTS cells support a single RACH channel, whereas all commercial UMTS cells that we have scan data for support two RACH channels. RACH channel configuration and support is an important feature for the UMTS machine learning RBSR detection algorithm.

Much like UMTS, the LTE anomaly detection algorithm processes a single commercial carrier at a time. The algorithm operates on encoded SIBs 1, 2, and 3. Many commercial carriers utilize SIB packing. Thus, to make it such that we can run the anomaly detection on ASN.1-encoded data, the first thing the LTE anomaly detection algorithm does is separate packed SIBs. For example, if a cell is broadcasting SIBs 2 and 3 as a single SIB, the algorithm breaks out the packed SIBs into their blocks as if they had been transmitted individually. The algorithm then takes the individual encoded SIBs, featurizes the encoded data, and inputs the featurized data byte by byte into an isolation forest, which is an unsupervised machine learning algorithm. The step of featurizing is discussed above in more detail. In using SIBs 1, 2, and 3, features such as broadcast message schedule, radio resource configuration, RACH configuration, and cell reselection are taken into consideration when running the isolation forest.

The anomaly detection algorithms for UMTS and LTE work well in environments where the number of real commercial cells is higher than the number of rogue cells. If the algorithm is used in an environment where there are more rogue cells than legitimate cells, performance of the algorithm degrades.

It is envisaged, according to the application, for a mechanism to detect that there are more rogue cells than legitimate cells. If so detected, the algorithm may be augmented to natively handle this scenario. Additionally or alternatively, if it is detected that there are more rogue cells than legitimate cells, the unsupervised machine learning detection algorithm may be bypassed so that the system does not erroneously raise false positives.

Broadcast Channel BSR Detection Using Classification

Figure 11:
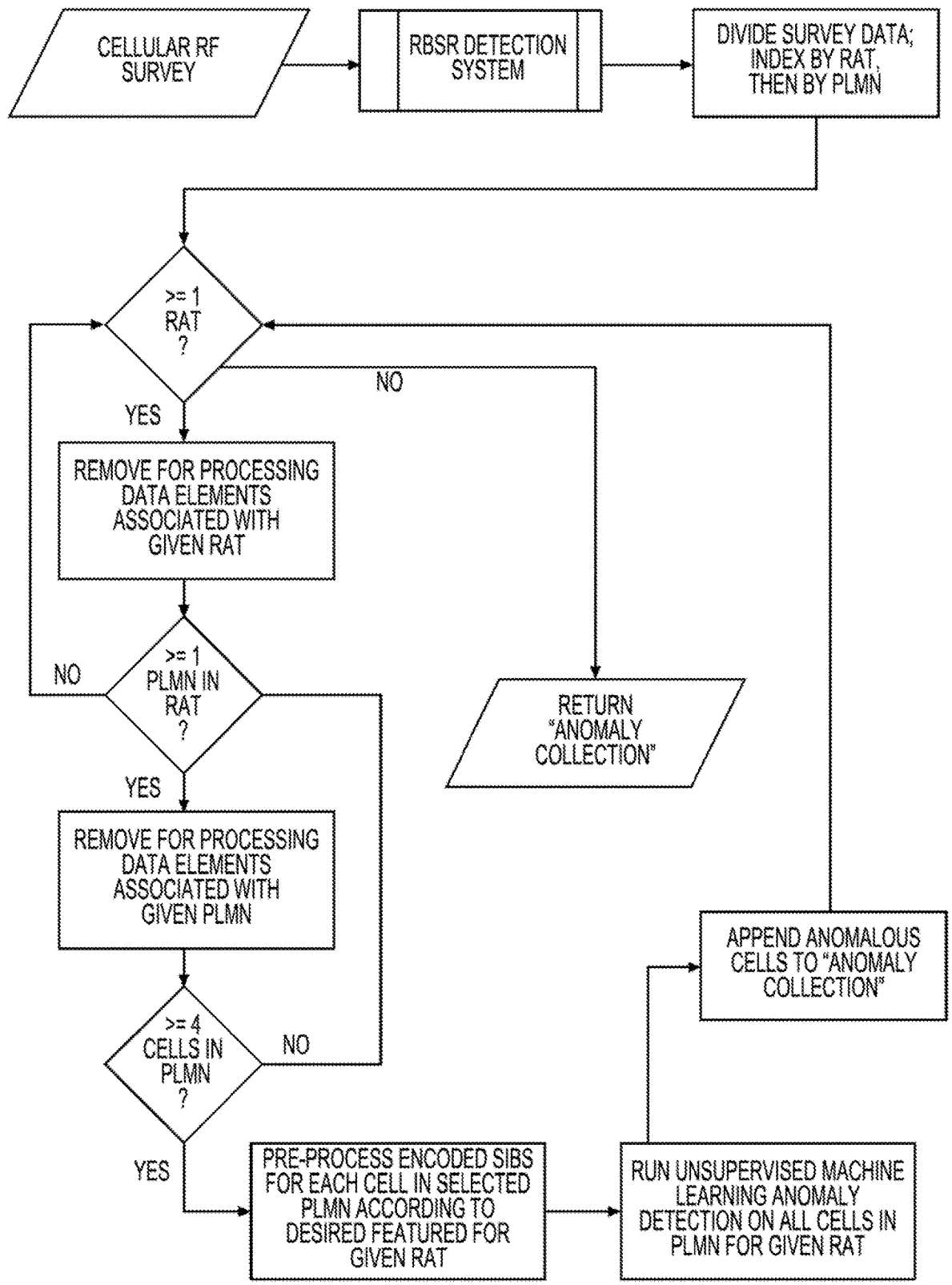
FIG. 11 illustrates a machine learning RBSR detection technique using unsupervised machine learning anomaly detection according to an aspect of the application.

FIG. 11 illustrates an exemplary flow chart for unsupervised machine learning techniques used for RBSR detection. The unsupervised machine learning RBSR detection algorithms do not require a priori knowledge about the commercial carriers in a given geographic area nor do they require extensive time-lapse survey. The algorithms may operate on a single scan (for instance in the standalone architecture), or can operate on a collection of surveys from various geographic regions (for instance, in the cloud-based architecture).

In using layer three broadcast data, cell features such as specification revision, neighbor contents, and broadcast message schedule are taken into consideration when running machine learning RBSR detection. Use of only a subset of the layer three broadcast messages is enough, in most cases, to produce an accurate anomaly detection algorithm for cellular protocols. Additionally, the broadcast messages and features from those broadcast messages that impact unsupervised machine learning RBSR detection differs for each RAT.

According to another embodiment, an algorithm is described that enables the RBSR detection and identification system to classify (i.e., identify) the manufacturer of (i.e., the technologies in use by) detected RBSRs. Knowing the technologies in use by suspected RBSRs enables stakeholders to make intelligent decisions about what actions to take given the presence of the rogue. Additionally, knowledge about what technologies the rogue is using will feed future work aimed at disabling or shutting down detected RBSRs.

Figure 12:
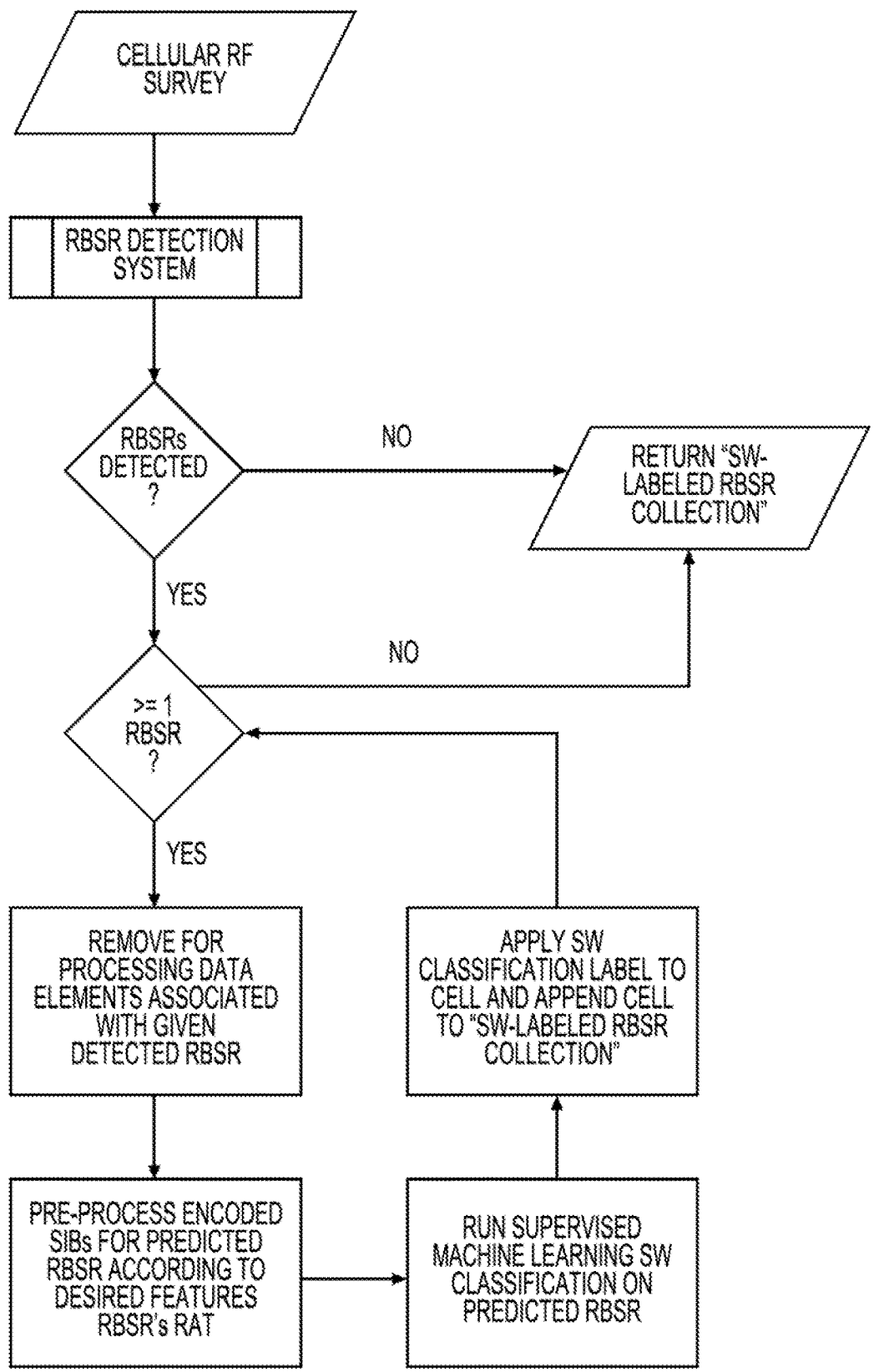
FIG. 12 illustrates a machine learning RBSR identification technique using supervised machine learning classification methods according to an aspect of the application.

FIG. 12 illustrates an exemplary flow chart for supervised machine learning techniques used for RBSR software identification. The supervised machine learning RBSR software identification algorithms use encoded layer three broadcast messages as input to supervised machine learning classification algorithms, such as a support vector machine or a neural network, to classify cells into known rogue cells and known commercial carriers.

The algorithm uses featurized, encoded broadcast messages as inputs into a support vector machine or a neural network classification algorithm to bucket cells into known rogue cells and known commercial carriers. A support vector machine and a neural network are supervised machine learning models, meaning that the algorithms are trained offline, before deployment, on known rogue cells. One aspect to consider when creating a broadly applicable rogue identification algorithm is access to training data from known rogue cells. The supervised machine learning rogue identification algorithms are capable of classifying all known open source stacks that could be in use by RBSRs.

Figure 13:
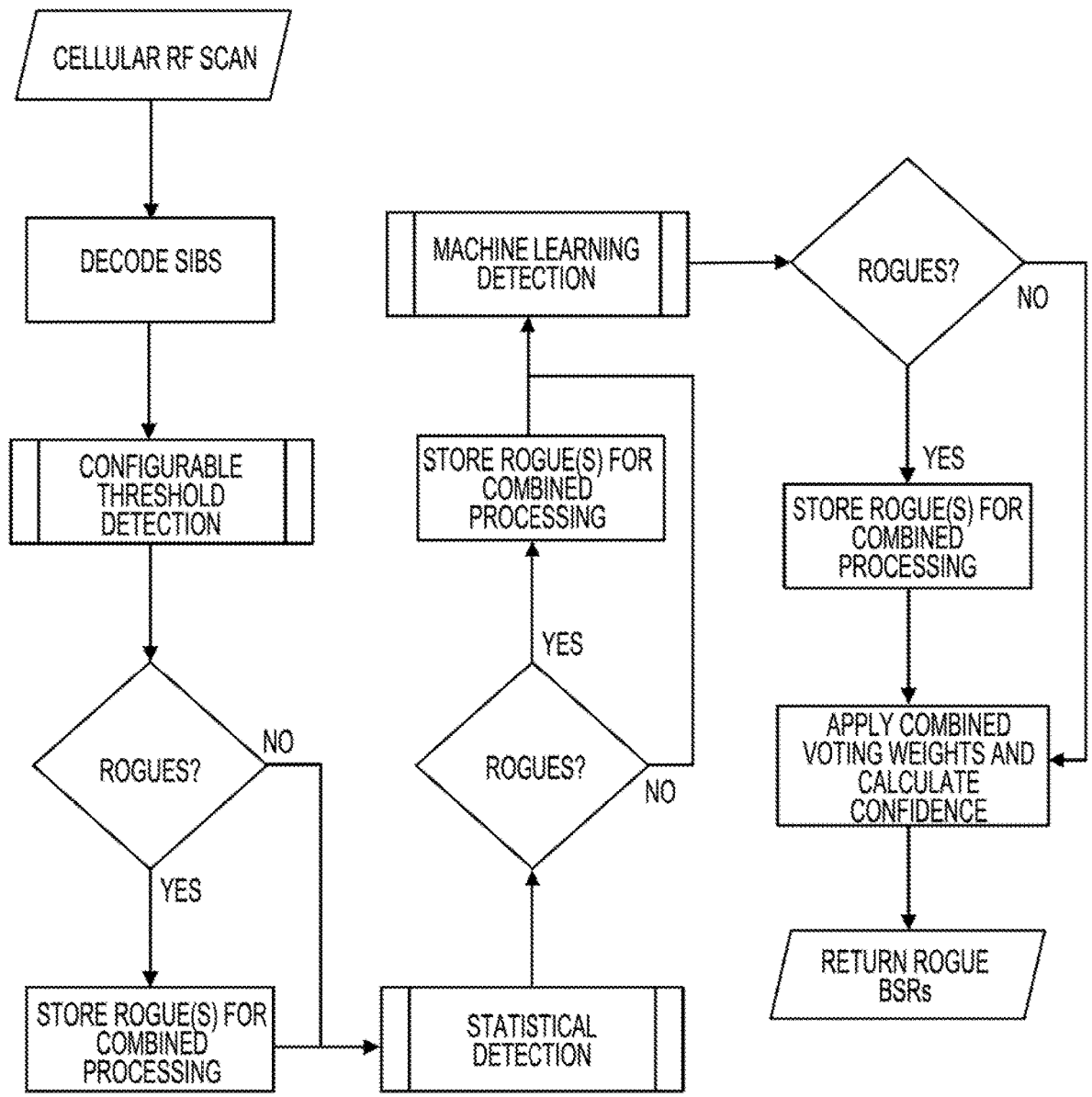
FIG. 13 illustrates an RBSR detection system flowchart according to an aspect of the application.

FIG. 13 illustrates an all-encompassing RBSR detection system, which includes a weighted result of the confidence threshold query for the machine learning algorithm discussed above, along with a confidence threshold query for the statistical and configurable threshold algorithms. The order of the three algorithms is arbitrary. The purpose of the combined voting weights from the three algorithms is to provide a more accurate confidence level for determining that a BSR/cellular tower is rogue. Employing one or more of the algorithms, either individually or collectively, is useful when one of the algorithms cannot effectively execute without broadcast information from at least two BSRs. For example, statistical and machine learning algorithms typically need broadcast information from at least two or more BSRs to make determinations of what is a normal configuration versus an outlier configuration. In such instances, the procedural algorithm is useful.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method for detecting a rogue device in a network comprising:
    surveying the network;
    collecting, based on the survey, broadcast data from cellular towers in the network;
    distilling the collected broadcast data into abstract syntax notation one (ASN.1)-encoded system information blocks (SIBs) associated with plural devices;
    featurizing the ASN.1-encoded SIBs;
    determining, for each of the plural devices, the times of a first and a last occurrence of the device on the network;
    running the featurized, ASN.1-encoded SIBs and the respective times of the first and last occurrences of the plural devices through an unsupervised machine learning algorithm, executed by a processor, to analyze all cells in the survey for the rogue device; and
    determining, based on the run, anomalous cells exhibiting characteristics of the rogue device from all cells in the survey.

2. The method of claim 1, wherein the collected broadcast data is based on a single radio access technology (RAT).

3. The method of claim 2, wherein the collected broadcast data is based on a public land mobile network (PLMN).

4. The method of claim 2, wherein the RAT is UMTS or LTE.

5. The method of claim 1, wherein the machine learning algorithm is selected from a k-means clustering algorithm, an isolation forest anomaly detection algorithm, and an agglomerative hierarchical clustering algorithm.

6. The method of claim 5, wherein the ASN.1-encoded SIBs include one or more of Universal Mobile Telecommunications System (UMTS) SIB 1, UMTS SIB 3 and UMTS SIB 5.

7. The method of claim 5, wherein the ASN.1-encoded SIBs include one or more of Long-Term Evolution (LTE) SIB 1, LTE SIB 2 and LTE SIB 3.

8. The method of claim 1, wherein
    the determining step includes confirming a number of native cells of a commercial carrier is greater than a number of rogue cells, and the determined cell is based on a single cellular scan of a geographic area.

9. The method of claim 1, further comprising notifying users on the network of the rogue device.

10. The method of claim 1, wherein the determined rogue device is a cellular tower or dynamic base station router.

11. The method of claim 1, further comprising:
displaying, on a graphical user interface (GUI), a location of the rogue device in the network.

12. The method of claim 1, further comprising:
displaying, on a GUI, the respective times of the first and last occurrences of the plural devices on the network; and
notifying users on the network of the rogue device based on the respective times of the first and last occurrences of the plural devices on the network.

13. The method of claim 1, further comprising:
identifying a manufacturer, technologies in use, or combinations thereof of the rogue device.

14. The method of claim 13, wherein the identifying step is based on use of at least one of a neural network and a support vector machine.

* * * * *